United States Patent
Barriau et al.

(10) Patent No.: US 9,522,974 B2
(45) Date of Patent: Dec. 20, 2016

(54) PRIMER COMPOSITIONS FOR ADHESIVE BONDING SYSTEMS AND COATINGS

(75) Inventors: Emilie Barriau, Duesseldorf (DE); Marcel Roth, Duesseldorf (DE); Ulrike Schmidt-Freytag, Duesseldorf (DE); Katja Klophaus, Cologne (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 693 days.

(21) Appl. No.: 12/728,605

(22) Filed: Mar. 22, 2010

(65) Prior Publication Data

US 2010/0285309 A1 Nov. 11, 2010

Related U.S. Application Data

(63) Continuation of application No. PCT/EP2008/062470, filed on Sep. 18, 2008, which is a continuation of application No. PCT/EP2007/008240, filed on Sep. 21, 2007.

(51) Int. Cl.
*C08G 59/08* (2006.01)
*C09D 163/00* (2006.01)
*B32B 15/092* (2006.01)
*C08G 59/06* (2006.01)
*C08G 59/18* (2006.01)
*C09D 5/00* (2006.01)
*C09D 5/08* (2006.01)

(52) U.S. Cl.
CPC ............ *C08G 59/066* (2013.01); *C08G 59/08* (2013.01); *C08G 59/184* (2013.01); *C09D 5/002* (2013.01); *C09D 5/086* (2013.01); *C09D 163/00* (2013.01); *Y10T 428/264* (2015.01); *Y10T 428/265* (2015.01); *Y10T 428/31515* (2015.04); *Y10T 428/31529* (2015.04)

(58) Field of Classification Search
CPC .............. C09D 5/08–5/12; C09D 5/02–5/028; C09D 163/00–163/10; C09D 5/002; C09D 5/086; C08L 63/00–63/10; C08G 59/066; C08G 59/184; C08G 59/08; Y10T 428/264; Y10T 428/265; Y10T 428/31515; Y10T 428/31529
See application file for complete search history.

(56) References Cited

U.S. PATENT DOCUMENTS

| | | | |
|---|---|---|---|
| 2,811,495 A * | 10/1957 | Wittcoff et al. | 523/414 |
| 3,713,904 A | 1/1973 | Bernath et al. | |
| 4,026,710 A | 5/1977 | Kennedy | |
| 4,297,269 A | 10/1981 | Merten | |
| 4,352,899 A | 10/1982 | Tada et al. | |
| 4,446,258 A * | 5/1984 | Chu et al. | 523/406 |
| 4,476,260 A | 10/1984 | Salensky | |
| 4,544,686 A | 10/1985 | Bromley | |
| 4,962,162 A * | 10/1990 | Kosuda et al. | 525/422 |
| 5,068,271 A | 11/1991 | Wheeler | |
| 5,126,385 A | 6/1992 | Seibert | |
| 5,252,737 A | 10/1993 | Stern | |
| 5,344,856 A | 9/1994 | Klein | |
| 5,416,090 A | 5/1995 | Bendele et al. | |
| 5,461,090 A | 10/1995 | Sweet | |
| 5,565,505 A | 10/1996 | Papalos | |
| 5,576,061 A | 11/1996 | Sweet | |
| 5,641,818 A | 6/1997 | Sweet | |
| 5,648,409 A | 7/1997 | Arora et al. | |
| 5,711,793 A | 1/1998 | Dannhorn et al. | |
| 5,719,210 A * | 2/1998 | Arora et al. | 523/404 |
| 5,859,095 A | 1/1999 | Moyle et al. | |
| 5,866,652 A | 2/1999 | Hager et al. | |
| 5,908,902 A * | 6/1999 | Pfeil | C08F 283/10 523/404 |
| 6,077,884 A * | 6/2000 | Hess et al. | 523/417 |
| 6,139,610 A | 10/2000 | Sinko | |
| 6,245,835 B1 * | 6/2001 | Klein et al. | 523/402 |
| 6,413,642 B1 | 7/2002 | Wegner et al. | |
| 6,475,621 B1 | 11/2002 | Kohli et al. | |
| 6,506,821 B1 | 1/2003 | Huver et al. | |
| 6,537,678 B1 | 3/2003 | Putnam | |
| 2006/0003166 A1 | 1/2006 | Wissing et al. | |
| 2006/0063862 A1 | 3/2006 | Luer et al. | |
| 2010/0151253 A1 * | 6/2010 | Roth et al. | 428/413 |

FOREIGN PATENT DOCUMENTS

| | | |
|---|---|---|
| DE | 19858920 A1 | 6/2000 |
| EP | 0796903 | 9/1997 |
| EP | 0855427 | 7/1998 |
| EP | 1197531 A1 | 3/2010 |
| GB | 2287943 A | 10/2005 |
| JP | 05194908 | 8/1993 |

(Continued)

OTHER PUBLICATIONS

"Challenges of chromate inhibitor pigments replacement in organic coatings", Progress in Organic Coatings, 42 (2001), pp. 267-282 by J. Sinko. Copyright 2001 Elsevier Science B.V.
International Preliminary Report on Patentability for International Application No. PCT/EP2007/008240, issued Mar. 24, 2010.
International Preliminary Report on Patentability for International Application No. PCT/EP2008/062470, issued Mar. 24, 2010.

(Continued)

*Primary Examiner* — Callie Shosho
*Assistant Examiner* — John Freeman
(74) *Attorney, Agent, or Firm* — Mary K. Cameron

(57) ABSTRACT

The present invention relates to aqueous-based primer composition, comprising at least one thermosetting, self-emulsifying epoxy resin composition; at least one thermosetting, non-self-emulsifying resin composition; water; and at least one curative.

36 Claims, No Drawings

(56) References Cited

FOREIGN PATENT DOCUMENTS

| JP | 07206982 | 8/1995 |
|----|----------|--------|
| JP | 08253552 | 10/1996 |
| JP | 09310044 | 12/1997 |
| WO | 9731962 A1 | 9/1997 |
| WO | 9731963 A1 | 9/1997 |
| WO | 9620971 A1 | 7/2006 |
| WO | 2007008199 A1 | 1/2007 |
| WO | 2007054304 A1 | 5/2007 |

OTHER PUBLICATIONS

International Search Report for International Application No. PCT/EP2007/008240, mailed Mar. 20, 2008.
International Search Report for International Application No. PCT/EP2008/062470, mailed Mar. 11, 2009.

* cited by examiner

PRIMER COMPOSITIONS FOR ADHESIVE BONDING SYSTEMS AND COATINGS

CROSS-REFERENCE TO RELATED APPLICATIONS

This application is a continuation under 35 U.S.C. Sections 365(c) and 120 of International Application No. PCT/EP2008/062470, filed Sep. 18, 2008 and published on Mar. 26, 2009 as WO 2009/037323, which claims priority from PCT/EP2007/008240 filed Sep. 21, 2007, which are incorporated herein by reference in their entirety.

FIELD OF THE INVENTION

The present invention relates to primer compositions for adhesive bonding systems and coatings, which are preferably substantially free of chromate. Significantly, the inventive primer compositions comprise an aqueous dispersion of at least one thermosetting, self-emulsifying epoxy resin composition; at least one thermosetting, non-self-emulsifying resin composition; water; and at least one curative.

BACKGROUND OF THE INVENTION

Conventionally, adhesive strength is optimized when the surfaces of the underlying structure has been cleaned to remove environmental contaminates, such as dirt, oxidation, and other debris immediately prior to bonding. With many manufacturing processes, however, the cleaning and bonding operations are often staged so that they are separated significantly in time, during which time the surface may become re-contaminated, thus lessening the adhesive strength of the bond to be formed.

To alleviate this concern, the cleaned surface may be primed with a primer. In the past, primers have often been prepared from one or two component thermosetting resins, typically diluted with organic solvents to allow for spray application. Liquid epoxy esters were proposed for use in coatings over forty years ago, in compositions containing either water or the epoxy ester itself as a carrier vehicle, together with polyvinylacetate, polyacrylic, or poly(butadiene/styrene).

One such example of these organic solvent based primers includes U.S. Pat. No. 4,352,899 (Tada), in which is described a coating composition for metal substrates of an epoxy resin, an organic phosphorus compound, zinc powder, and a magnesium compound dispersed in a liquid medium. A portion of the zinc powder may be replaced by a solid electroconductive material. These compositions are applied in organic solvents, and the compositions may contain various pigments including chromate pigments.

In an effort to address environmental and regulatory concerns over the use of organic solvents, two component primer systems have been designed and developed in which one component is an epoxy resin dispersion in water, either with a reduced volume of solvent or not at all, together with various corrosion inhibitors, mainly chromate based ones, and the second component is a reducible amine catalyst in water.

For instance, U.S. Pat. Nos. 5,461,090, 5,576,061, and 5,641,818, each disclose an aqueous, essentially VOC-free adhesive epoxy primer for promoting the bonding of a metal adherend to another adherend without reported loss of physical properties, in a storage stable environment, and exhibiting solvent resistance. The primer disclosed by these patents is prepared by dispersing one or more solid epoxy resins and a solid curing agent into water such that 100% of the solid particles of epoxy resin and curing agent have a size of less than 30 .mu.m.

Further environmental and regulatory issues have developed recently over the use of chromates, and in particular the use of chromates as corrosion inhibitors. In the past, various types of liquid coating compositions have been applied to metallic substrates and baked thereon in order to protect the substrates against corrosion. Certain of such coatings are applied in conventional metal coil coating processes, and they must be sufficiently adherent and flexible to resist cracking, chipping and peeling. One process which has been utilized for improving the corrosion-resistance of various metal substrates generally involves the application of two coatings. The first coating is comprised of a material, such as xanthan gum, as a carrier for the other ingredients of the coating which include a chromium compound such as chromium trioxide and zinc dust. On baking, the xanthan gum contained in the coating becomes water-insoluble. Over this baked coating is applied a second coating which comprises a zinc rich resin. U.S. Pat. No. 4,026,710 (Kennedy) describes such two-step procedures for improving the corrosion-resistance of metal. In this case a special tenside is used in order to get the resins dispersed in water.

U.S. Pat. No. 3,713,904 (Bernath) describes compositions for producing corrosion-resistant and protective coatings on aluminum and aluminum alloys, which are based on an organic resin, an inorganic hexavalent chromium compound, an oxidizable component, phosphoric acid and strontium chromate. On mixing, the strontium chromate and oxidizable component react to reduce the hexavalent chromium to trivalent chromium. The mixture is applied to the substrate, which is then heated to oxidize a portion of trivalent chromium to hexavalent chromium resulting in a strongly adherent organic resin coating.

And U.S. Pat. No. 5,859,095 (Moyle) claims an aqueous composition of a water-dispersible or emulsifiable epoxy resin together chromium trioxide, water, phosphoric acid and a polytetrafluoroethylene lubricant.

One approach to the elimination of chromate in corrosion inhibitor packages involved the use of zinc. Zinc-rich coatings useful for improving corrosion-resistance are described in U.S. Pat. No. 4,476,260 (Salensky). These coatings include generally a mixture of zinc pigment, thermoplastic epoxy resins, an organosilane and optionally aluminum trihydrate and one or more dispersing agents. A washcoat composition suitable for application to tin-plated mild steel is described in U.S. Pat. No. 4,544,686 (Bromley), which includes an aqueous carrier medium and a binder. The washcoat composition includes a thermosetting acrylic polymer, an epoxy resin and an acid catalyst.

In addition, U.S. Pat. No. 6,139,610 (Sinko) claims a corrosion-inhibiting composition for application to a metal substrate. The composition so claimed is a film-forming organic polymer which has dispersed therein a corrosion inhibiting pigment phase, which itself is a composite organic/inorganic hybrid microparticle formed of an inorganic corrosion inhibiting compound which is interfaced on a microscopic level with micro-particles formed of an organic corrosion-inhibiting compound. These inorganic and organic compounds are said to be distinctly identifiable by spectrum analysis, but physically combined into inseparable component phases having different chemical compositions.

U.S. Pat. No. 5,866,652 (Hager) relates to a coating on a metallic skin of an aircraft. The coating includes a continuous phase of an organic polymer or sol-gel, and a mixture of chromate-free salts dispersed throughout the continuous phase. The mixture of chromate-free salts includes carboxylate salts of rare earth metals and vanadate salts of alkali or alkali earth metals; and a borate salt of an alkali earth metal. The coating is reported to protect the metallic skin from significant pitting corrosion after 3,000 hours of exposure to a spray of 5 wt % sodium chloride solution. The coating is reported to be resistant to degradation by aircraft hydraulic fluid. In addition, the coating is reported to be able to withstand a 50-inch-pound forward impact delivered by a Gardner 160 pound capacity test machine.

Aqueous primer compositions containing substantially no volatile organic solvents are described in U.S. Pat. No. 5,461,090 (Sweet). The composition may also contain non-chromate corrosion inhibitors, preferably such as zinc phosphate and zinc molybdate.

In addition U.S. Pat. No. 6,537,678 (Putnam) reports of non-carcinogenic corrosion inhibiting additives. These additives include an anodic corrosion inhibitor and cathodic corrosion inhibitor, where the anodic corrosion inhibitor is selected from compounds of vanadium, molybdenum, tungsten and the cathodic corrosion inhibitor is selected from compounds of cerium, neodymium, and praseodymium.

Self-dispersing curable epoxy resins for coatings are disclosed in U.S. Pat. No. 6,506,821 and international Patent Publication No. WO 96/20971. In U.S. Pat. No. 6,506,821 (Huver), self dispersible curable epoxy resin composition are obtainable by the reaction of 1.0 equivalent of epoxy resin, 0.01 to 1.0 equivalent of a polyhydric phenol and 0.005 to 0.5 equivalent of an amine-epoxy adduct, the amine-epoxy adduct being a reaction product of an aromatic polyepoxide with a polyalkyleneamine. The aromatic polyepoxide and the polyoxyalkyleneamine are used in an equivalent ratio of 1:0.1 to 1:0.28.

In U.S. Pat. No. 5,648,409 (Katar), self-dispersing curable epoxy resin compositions are prepared by reacting 1.0 equivalent of epoxy resin, 0.01 to 1.0 equivalent of a polyhydric phenol and 0.005 to 0.5 equivalents of an amine-epoxy adduct, the amine-epoxy adduct being a reaction product of 1.0 equivalent of an aromatic polyepoxide and 0.3 to 0.9 equivalent of a polyalkyleneamine.

The international Patent Publication No. WO 07/008199 discloses a VOC free aqueous-based primer compositions comprising a thermosetting resin composition, a corrosion inhibitor, water and a curative for adhesive bonding systems and coatings, especially to inhibit corrosion. The inventive primer compositions are substantially free of chromate but always comprise corrosion-inhibitors, like organic salts, pigments or anodic and cathodic inhibitors. Preferably these inhibitors have a particle size which is less than the primer layer thickness of a coating to provide less corroding surface. The production of particles of this size is expensive and requires special apparatus and trained personnel.

Notwithstanding the state of the technology, it would be desirable to create alternative substantially VOC free primer for producing corrosion-resistant and protective coatings and adhesive bonding systems that are prepared with substantially no chromate component; are substantially free of additional corrosion inhibitors or only comprise a reduced amount of said corrosion inhibitors and still inhibit corrosion; can easily be adapted to different application profiles and when cured, exhibits resistance to organic solvents and corrosion, so that the end user has a variety of commercial sources of advanced primers from which to choose.

Further, it would be desirable to provide a coating, a primer and sealant composition for application to metal surfaces for protecting exposed surfaces against corrosion.

SUMMARY OF THE INVENTION

The present invention relates to an aqueous-based primer composition, comprising at least one thermosetting, self-emulsifying epoxy resin composition; at least one thermosetting, non-self-emulsifying resin composition; water; and at least one curative.

Preferably, the present invention provides a substantially VOC free primer composition. The primer compositions of the present invention when applied to metal surfaces inhibit corrosion and provide a long lasting resistance to surfaces against corrosion. Preferably, the composition is prepared without a chromate component and as such is substantially chromate free and can easily be adapted to different applications. When cured, the primer composition exhibits resistance to organic solvents and corrosion. The primer composition is also used to prepare an assembly of two substrates bonded by the primer and a cured adhesive.

The aqueous based primer composition in its broadest sense is comprised of an aqueous dispersion of at least one thermosetting, self-emulsifying epoxy resin composition; at least one thermosetting, non-self-emulsifying resin composition; water; and at least one curative.

The term "thermosetting, self-emulsifying epoxy resin composition" in the context of the present invention stands for a composition that can comprise one or several thermosetting, self-emulsifying epoxy resin(s). The term "thermosetting, non-self-emulsifying epoxy resin composition" in the context of the present invention stands for a composition that can comprise one or several thermosetting, non-self-emulsifying epoxy resin(s). An "aqueous-based primer composition" in the context of the present invention can comprise further ingredients in addition to the at least one thermosetting, self-emulsifying epoxy resin composition, the at least one thermosetting, non-self-emulsifying epoxy resin, the at least one curative and water.

The at least thermosetting, self-emulsifying epoxy resin composition is based on a polyoxyalkyleneamine prepared by reacting (a) 1.0 reactive equivalents of an epoxy resin, (b) from about 0.01 to 1.0 reactive equivalents (e.g. from about 0.4 to about 0.6 reactive equivalents or from about 0.65 to about 0.95 reactive equivalents) of a polyhydric phenol, and (c) from about 0.005 to 0.5 reactive equivalents of an amine epoxy adduct, wherein the amine-epoxy adduct is formed upon contacting 1.0 equivalents of an aromatic polyepoxide and from about 0.3 and 0.9 reactive equivalents of a polyoxyalkyleneamine. The preparation of such self-emulsifying curable epoxy resins is described in detail for example in column 2 line 46 to line 55, column 5 line 29 to line 46 and examples 1 to 4 of U.S. Pat. No. 6,506,821 which is incorporated herein by reference.

The expression "self-emulsifying" epoxy resin in the context of the present invention means that said epoxy resin forms stable emulsions in water spontaneously without the use of additional additives, such as emulsifying additives. Preferably the term stable emulsion as used herein refers to an emulsion in which at least 99% by weight, preferably 100% by weight of the self-emulsifying epoxy resin, based on the total amount of the self-emulsifying curable epoxy resin, do not settle to the bottom and form a solid precipitate at ambient temperature for a period of six months or after four weeks at 40° C.

Self-emulsifying curable epoxy resins are described in detailed in U.S. Pat. No. 5,565,505 (see e.g. column 2 line 66 to column 3 line 12 and examples 1 to 4) filed Jun. 14, 1994 (which is a continuation-in-part of U.S. Ser. No. 08/086,288, filed Jun. 30, 1993) by J. Papalos et al., entitled "Self-Dispersing Curable Epoxy Resins, Dispersions Made Therewith, and Coating Compositions Made Therefrom".

The replacement of standard epoxy resins by self-emulsifying epoxy resins provides less free molecules and reduces the diffusion of water into the primer layer, thus swelling of the primer layer is decreased. Further, in the effort to the environment the use of self-emulsifying epoxy resin improves the cross linking in the curing and reduce the need of additional emulsifier.

Self-emulsifying epoxy resins are obtainable by first providing a solid epoxy resin, then providing dispersion of this solid epoxy resin, wherein the dispersion of the solid epoxy resin preferably comprises less than 10%, more preferably less than 5% and most preferably substantially no organic solvent. Desirably, the solid epoxy resin is dispersed in water.

In certain embodiments, the at least one thermosetting, non-self-emulsifying resin composition is preferably selected form the group consisting of epoxy resins, benzoxazine resins, polyurethane resins, cyanoacrylate resins, acrylic resins, epoxy-acrylate resins, triazine resins, polyimide resins, acrylic ester resins, thermoplastic resins, and/or combinations or copolymers thereof. Preferably the at least one self-emulsifying epoxy resin composition acts as an emulsifier for the at least one non-self-emulsifying resin composition, forming stable droplets as aggregate structures.

Different non-self-emulsifying resins can be encapsulated within said aggregate structure, making the system easily adaptable to different application profiles. When cured, the non-self-emulsifying resin composition improves the anti-corrosive properties of the formulation and reduces the need for additional corrosion-inhibitors. For various applications, e.g. interior coatings, an inventive primer composition which does not comprise additional corrosion inhibitors can be applied to exposed surfaces, still protecting, in a sufficient manner, said exposed surfaces against corrosion.

Additionally the mechanical properties of the cured formulation, regarding flexibility, UV-resistance, adhesion and scratch resistance are enhanced by the at least one non-self-emulsifying resin composition.

The aqueous dispersion includes from about 1 to about 60 wt %, such as about 10 to about 25 wt %, of the dispersed primer, with the aqueous phase representing the balance.

Preferably, the aqueous dispersion can be stored at ambient temperatures for a period of time of up to three months for 1K systems and up to two hours for 2K systems without any appreciable loss in the ability to be applied to a surface to be bonded, such as a metal surface. In a preferred embodiment of the present invention the aqueous-based primer composition of the present invention is cured in about 1 second to 14 days at a temperature within the range of about 15° C. to about 250° C. When cured, the primer exhibits excellent resistance to organic solvents and corrosion.

DETAILED DESCRIPTION OF THE INVENTION

As noted above, the aqueous-based primer composition of the invention in its broadest sense is comprised of an aqueous dispersion of at least one thermosetting, self-emulsifying epoxy resin composition; at least one thermosetting, non-self-emulsifying resin composition; water; and at least one curative.

The at least one thermosetting self-emulsifying epoxy resin may be preferably a self-emulsifying curable epoxy resin based on a polyoxyalkyleneamine prepared by reacting an epoxy resin, a polyhydric phenol, and an amine epoxy adduct, wherein the amine-epoxy adduct is formed upon contacting an aromatic polyepoxide and a polyoxyalkyleneamine. The preparation of such self-emulsifying curable epoxy resins is described in detail for example in column 2 line 46 to line 55, column 5 line 29 to line 46 and examples 1 to 4 of U.S. Pat. No. 6,506,821.

The epoxy resin to practice this invention may include one or more polyglycidyl ethers of polyhydric phenols having two or more epoxide groups and one or more six-carbon aromatized rings present in the molecule, as represented by the structural formula:

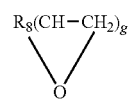

where $R_8$ represents a "g" valent $C_6$-$C_{50}$ organic radical comprising at least one six-carbon aromatized ring (e.g. when g is 2, $R_5$ can be —$CH_2$—O—X—$C(CH_3)_2$—X—O—$CH_2$— or $R_5$ can be —$CH_2$—O—X—$CH_2$—X—O—$CH_2$— wherein X represents a phenyl group), and "g" is equal to or greater than 2 but less than or equal to 6.

Techniques to prepare such epoxy resins are known in the art, and include reacting compounds having 2 or more hydroxyl groups with epichlorohydrin in the presence of a suitable catalyst. Suitable epoxy resins are commercially available from a variety of sources. Epoxy resins suitable for use in the present invention are polyglycidyl derivatives of phenolic compounds, such as those available under the tradenames EPON 825, EPON 826, EPON 828, EPON 1001, EPON 1007 and EPON 1009 or waterborne dispersions under the tradenames EPI-REZ 3510, EPI-REZ 323, EPI-REZ 3515, EPI-REZ 3520, EPI-REZ 3522, EPI-REZ 3540 or EPI-REZ 3546 from Resolution Performance Products; DER 331, DER 332, DER 383, DER 354, and DER 542 from Dow Chemical Co.; GY285 from Vantico, Inc.

Other suitable epoxy resins include polyepoxides prepared from polyols and the like and polyglycidyl derivatives of phenol-formaldehyde novolacs, the latter of which are available commercially under the tradenames DEN 431, DEN 438, and DEN 439 from Dow Chemical Company and a waterborne dispersion ARALDITE PZ 323 from Vantico.

Cresol analogs are also available commercially such as ECN 1273, ECN 1280, ECN 1285, and ECN 1299 or waterborne dispersions ARALDITE ECN 1400 from Vantico, Inc. SU-8 and EPI-REZ 5003 are bisphenol A-type epoxy novolacs available from Resolution Performance Products.

EPON epoxy resins are also available from Shell Chemical Company, Houston, Tex., and DER- or DEN-brand epoxy resins from Dow Chemical Company, Midland, Mich.

Examples of suitable epoxy resins are:
I) Polyglycidyl and poly(beta-methylglycidyl) esters obtainable by reacting a compound having at least two carboxy groups in the molecule with epichlorohydrin or beta-methylepichlorohydrin, respectively. The reaction is advantageously carried out in the presence of bases. Examples of aromatic polycarboxylic acids which may be used include, for example, phthalic acid, isophthalic acid or terephthalic acid.

II) Polyglycidyl or poly (beta-methylglycidyl) ethers obtainable by reacting a compound having at least two free phenolic hydroxy groups with epichlorohydrin or beta-methylepichlorohydrin, respectively, under alkaline conditions, or in the presence of an acid catalyst and with subsequent alkali treatment.

The epoxy compounds of this type may be derived from mononuclear phenols, such as, for example, resorcinol or hydroquinone; or they are based on polynuclear phenols, such as, for example, bis(4-hydroxyphenyl)methane, 4,4-dihydroxybiphenyl, bis(4-hydroxyphenyl)sulfone, 1,1,2,2-tetrakis(4-hydroxyphenyl)ethane, 2,2-bis(4-hydroxyphenyl) propane, 2,2-bis(3,5-dibromo-4-hydroxyphenyl) propane, and from novolacs obtainable by condensation of aldehydes, such as formaldehyde, acetaldehyde, chloral or furfuraldehyde, with phenols, such as phenol, or with phenols that are substituted in the nucleus by halide atoms or $C_1$-$C_{18}$ (preferably $C_1$-$C_9$) alkyl groups, such as, for example, 4-chlorophenol, 2-methylphenol or 4-tert-butylphenol, or by condensation with bisphenols, in the manner described above.

There are preferably used epoxy resins that have an epoxy content of from 2 to 10 equivalents/mole and that are glycidyl ethers or glycidyl esters of aromatic or alkylaromatic compounds. Especially preferred epoxy resins are polyglycidyl ethers of bisphenols, such as, for example, of 2, 2-bis(4-hydroxyphenyl) propane (bisphenol A) or bis(4-hydroxyphenyl) methane (bisphenol F), or novolacs formed by reacting formaldehyde with a phenol, with polyglycidyl ethers based on bisphenol A being particularly desirable. Preferred epoxy resins have an epoxide equivalent weight of less than about 400 grams/equivalent, e.g. from about 100 grams/equivalent to about 350 grams/equivalent, more preferably from about 150 grams/equivalent to about 225 grams/equivalent, e.g. DER 331 available from Dow Chemical at about 182 grams/equivalent.

The polyhydric phenol reactant comprises one or more compounds each having a plurality of hydroxyl groups covalently bonded to one or more six-carbon aromatized rings. The polyhydric phenol reactant may contain substituents such as alkyl, aryl, sulfido, sulfonyl, halo, and the like. The polyhydric phenol is represented by the structural formula: $R_g(OH)_h$ wherein $R_9$ represents an "h" valent $C_6$-$C_{50}$ organic radical comprising at least one six-carbon aromatized ring, and "h" represents a number of phenolic hydroxyl groups where "h" is equal to or greater than 2 but less than or equal to 6.

Techniques to prepare suitable polyhydric phenol compounds are known in the art. Suitable polyhydric phenol compounds are commercially available from Dow Chemical Company, Midland Mich., and Shell Chemical Company, Houston, Tex.

Illustrative of suitable polyhydric phenols are 2,2-bis(4-hydroxyphenyl)propane, 2,2-bis(3-bromo-4hydroxyphenyl)-propane, 2,2-bis(3,5-dichloro-4-hydroxyphenyl)propane, 2,2-bis(3-chloro-4hydroxyphenyl) propane, bis(4-hydroxyphenyl)-methane, bis(4hydroxyphenyl) sulfone, bis(4-hydroxyphenyl)sulfide, resorcinol, hydroquinone, phenol-formaldehyde novolac resins, tetrabrombisphenol A, 4,4'-dihydroxydiphenlcyclohexyne, 4,4'-dihydroxy-3,3'-dimethyldiphenylpropane, 4,4'-dihydroxy-benzophenol, bis-(4-hydroxyphenyl-1,1'-ethane, bis-(4-hydroxyphenyl)-1,1'-isobutane, bis-(4-hydroxyphenyl)-ether) and the like. The most preferred dihydric phenols are 2, 2-bis(4-hydroxyphenyl) propane (bisphenol A) and bis(4hydroxyphenyl)methane (bisphenol F).

The polyoxyalkyleneamine reactant comprises one or more amino-compounds where the amino-compound comprises both an amine group and a substantially water-soluble polyether chain.

The polyoxyalkyleneamine reactant is soluble or at least partially soluble in water. Techniques to prepare suitable polyoxyalkyleneamine reactants are known in the art, and include reacting a hydroxyl group containing initiator with ethylene oxide and/or propylene oxide, followed by conversion of the resulting terminal hydroxyl group(s) to amine(s).

Illustrative polyalkyleneamine comprises members selected from the group consisting of polyether amines containing primary amino groups attached to the terminus of a polyether backbone, which is based either on propylene oxide, ethylene oxide or mixed ethylene oxide and propylene oxide, wherein the molecular ratio of propylene oxide to ethylene oxide is 9:1, 3:19, 29:6 or 10:31 and the molecular weight of the polyalkyleneamine is up to 5000.

Among the commercially available polyoxyalkyleneamines suitable for use in the present invention is the Jeffamine-brand of polyoxyalkyleneamines available from Huntsman, such as Jeffamine M-600, M-1000, M-2005, M-2070.

Polyoxyalkyleneamines of this invention have the structural formula

$$R_1-O-R_2-CH_2CH(R_3)-NH_2$$

where $R_1$, designates a monovalent organic radical selected from the group consisting of $C_1$ to $C_{12}$ aliphatic, alicyclic or aromatic hydrocarbons, and $R_2$ represents a polyoxyalkylene chain having the structural formula: $(CH_2-CH_2-O)_a$ $-(CH_2-CH(R_4)-O)_b$ where $R_4$ is a monovalent organic radical selected from the group consisting of $C_1$ to $C_4$ aliphatic hydrocarbons, "a" designates a number of ethoxy groups $(CH_2-CH_2-O)$, "b" designates a number of monosubstituted ethoxy groups $(CH_2CH(R_4)-O)$ where the substitution of one monosubstituted ethoxy group is independent from the substitution of any other monosubstituted ethoxy group in the polyoxyalkylene chain, the sum of "a" and "b" is equal to or greater than 10 but less than or equal to 200, and where the sequence of ethoxy and monosubstituted ethoxy groups within a polyoxyalkylene chain may be completely random and/or there may be blocks of ethoxy and/or monosubstituted ethoxy groups, and $R_3$ designates H or a monovalent organic radical selected from $C_1$ to $C_4$ aliphatic hydrocarbons.

In certain embodiments, the polyoxyalkyleneamine is adducted with an aromatic polyepoxide and the adduct is reacted with an epoxy resin. In these embodiments, the preferred polyoxyalkyleneamines have $R_1$, $R_3$ and $R_4$ each equal to methyl, and either (i) a ratio of "a" and "b" of about 4:1, where the ethoxy and iso-propoxy groups are arranged in random blocks and the molecular weight of the polyoxyalkyleneamine is less than about 4000, or (ii) a block of 5 ethoxy groups joined to a random sequence of ethoxy and iso-propoxy groups wherein the ratio of "a" and "b" in the random sequence is about 7:3 and the molecular weight of the polyoxyalkyleneamine is less than about 4000, or (iii) a ratio of "a" and "b" of about 95:5, where the ethoxy and iso-propoxy groups are arranged substantially in two blocks and the molecular weight of the polyoxyalkyleneamine is less than about 6000, or (iv) a ratio of "a" and "b" of about 7:3, wherein the ethoxy and iso-propoxy groups are present in random sequence and the molecular weight of the polyoxyalkyleneamine is less than about 4000, or (v) a ratio of "a" and "b" of about 4:1, where the ethoxy and isopropoxy groups are present in random sequence and the molecular weight of the polyoxyalkyleneamine is less than about 4000.

The most preferred polyoxyalkyleneamine is Jeffamine M-2070 from Texaco Chemical Company, Bellaire, Tex. According to Texaco, this polyoxyalkyleneamine is prepared by reacting methanol with ethylene oxide and propylene oxide followed by conversion of the resulting terminal hydroxyl group to an amine. The most preferred polyoxyalkyleneamine has an approximate molecular weight of 2000 and a mole ratio of propylene oxide to ethylene oxide of 10/32.

The aromatic polyepoxide reactant comprises one or more compounds each having a plurality of epoxide functional groups. The aromatic polyepoxide reactant has at least 2 epoxide groups present in the molecule, and may have as many as 4 epoxide groups present in the molecule.

These polyepoxides can be obtained by reaction of epichlorohydrin and polymeric aromatic alcohols or amines using known techniques. Suitable aromatic alcohols and amines are those containing more than two hydrogen equivalents capable of reacting with epichlorohydrin.

Examples of suitable aromatic alcohols are novolac phenolic resins and polyvinyl phenol)s. Illustrative of suitable polyhydric phenols are 2,2-bis(4-hydroxyphenyl)propane, 2,2-bis(3-bromo-4hydroxyphenyl)-propane, 2,2-bis(3,5-dichloro-4-hydroxyphenyl)propane, 2,2-bis(3-chloro-4-hydroxyphenyl)propane, bis(4-hydroxyphenyl)-methane, bis (4-hydroxyphenyl)sulfone, bis(4-hydroxyphenyl)sulfide, resorcinol, hydroquinone, phenol-formaldehyde novolac resins, and the like.

Examples of suitable aromatic amines are 4,4-diaminodiphenylenemethane, 4,4-diaminodiphenylene sulfone, 3-aminobenzylamine, 3-phenylenediamine and 4,4-diaminoazodiphenylene. One representative class of aromatic polyepoxide reactant according to the invention has the structural formula:

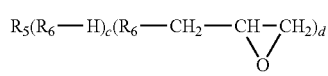

where $R_5$ designates an aromatic organic radical having a valency equal to the sum of "c" and "d", where the sum of "c" and "d" is equal to or greater than 2 but no more than or equal to 6 and where "d" is equal to or greater than 2 but less than or equal to 6. The term "aromatics" embraces groups such as phenyl, naphthyl, quinolyl, pyridyl, indoyl and the like in which the ring may be substituted by groups such as $C_1$ to $C_6$ alkyl, amino, nitro, halo, and the like and $R_6$ represents a divalent polyoxyalkylene chain having the structural formula:

—O—(CH$_2$—CH$_2$—O)$_e$—(CH$_2$—CH(R$_7$)—O)$_f$ where $R_7$ is a monovalent organic radical selected from $C_1$ to $C_4$ aliphatic hydrocarbons, "e" designates a number of ethoxy groups (CH$_2$—CH$_2$—O), "f" designates a number of monosubstituted ethoxy groups (CH$_2$—CH(R$_7$)—O) where the substitution of one monosubstituted ethoxy group is independent from the substitution of any other monosubstituted ethoxy group in the polyoxyalkylene chain, the sum of "e" and "f" is equal to or greater than 0 but less than or equal to 10, and where the sequence of ethoxy and monosubstituted ethoxy groups within a polyoxyalkylene chain may be completely random and/or there may be blocks of ethoxy and/or monosubstituted ethoxy groups. Typically, the average molecular weight of the polyoxyalkylene chain is from about 2000 to 10000.

The most preferred aromatic polyepoxides are epoxy novolac resins such as Araldite EPN 1138 and 1139, epoxy cresol novolac resins such as Araldite ECN 1235, 1273, 1280 and 12 99, epoxy phenol novolac resins such as Araldite PV 720, epoxy resin 0510, Araldite MY 720 and 721, and Araldite PT 810 all of which are available from Ciba-Geigy. Tetrad C and Tetrad X resins available from Mitsubishi Gas Chemical Co. are also suitable for use in this invention.

The preparation of certain of the self-emulsifying curable epoxy resins of the invention proceeds through an amine-epoxy adduct, where the amine-epoxy adduct is subsequently reacted with an epoxy resin and, optionally, a polyhydric phenol. The structure of the amine-epoxy adduct is dependent on the structures of the polyoxyalkyleneamine and the aromatic polyepoxide used in the preparation of the amine-epoxy adduct, as well as the relative ratio of the reactants. An adduct formed by reacting 1.0 equivalents of an aromatic polyepoxide and from about 0.3 to 0.9 reactive equivalents, preferably from about 0.6 and 0.8 reactive equivalents of a polyoxyalkyleneamine will produce compounds having the structural formula:

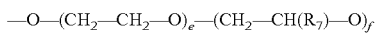

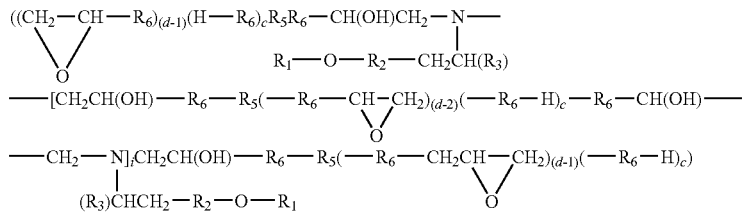

where "i" indicates a number of repetitive units where "i" is equal to or greater than zero (0) but less than or equal to about fifty.

If the adduct is formed by reacting 1.0 equivalents of an aromatic polyepoxide with from greater than about 1.0 equivalent (preferably from about 1.01 to about 2.5) reactive equivalents of a polyoxyalkyleneamine, the adduct will have the structural formula:

(R—NH—CH$_2$—CH(OH)CH$_2$—R$_6$)$_{(d-1)}$(H—R$_6$)$_c$—
R$_5$—R$_6$—CH$_2$—CH(OH)CH$_2$—N(R)—[CH$_2$CH
(OH)—R$_6$—R$_5$(—R$_6$CH$_2$—CH(OH)—CH$_2$—
NH(R))$_{(d-2)}$(—R$_6$—H)c-R$_6$CH$_2$—CH(OH)—
CH$_2$—N(R)]$_i$—CH$_2$CH(OH)CH$_2$—R$_6$—R$_5$(—
R$_6$—CH$_2$CH(OH)—CH$_2$—NH(R))$_{(d-1)}$(—R$_6$—
H)$_c$ where "i" indicates a number of repetitive units where "i" is equal to or greater than zero (0) but less than or equal to about fifty, typically from about 10 to about 20.

Preferably, the at least one thermosetting self-emulsifying epoxy resin of the present invention is a self-emulsifying bisphenol A which is optionally modified with phenol-formaldehyde epoxy resin, bisphenol F modified phenol-formaldehyde epoxy resin, wherein the phenol-formaldehyde is preferably an epoxy novolac resin, an epoxy cresol novolac resin, an epoxy phenol novolac resin, and the like.

Thermosetting self-emulsifying epoxy resins are obtainable by first providing a solid epoxy resin, then providing dispersion of this solid epoxy resin, wherein the dispersion of the solid epoxy resin preferably comprises less than 10%, more preferably less than 5% and most preferably substantially no organic solvent. Desirably, the solid epoxy resin is dispersed in water.

The at least one thermosetting, non-self-emulsifying resin composition is preferably selected form the group consisting of epoxy resins, benzoxazine resins, polyurethane resins, cyanoacrylate resins, acrylic resins, epoxy-acrylate resins, triazine resins, polyimide resins, acrylic ester resins, thermoplastic resins and/or combinations or copolymers thereof.

In a desirable embodiment of the present invention an aggregate structure, such as a micellar aggregate structure, is formed by the at least one thermosetting, self-emulsifying epoxy resin composition of the present invention and the at least one thermosetting, non-self-emulsifying resin composition of the present invention. The particle size of said aggregate structure is within the range of about 5 nm to about 1 µm, preferably of about 50 nm to 500 nm and most preferably of about 150 nm to about 200 nm. The particle size can be determined by laser diffraction using a Mastersizer 2000 (brand name, produced by Malvern instruments Ltd, calculation according to Mie)

The term "particle size" as used in the present invention refers to the $d_{0.5}$ particle diameter. $d_{0.5}$ represents a particle diameter defining that 50% of the particles are greater than this, and another 50% of the particles are smaller than this.

Different thermosetting non-self-emulsifying resins of the present invention can be encapsulated within said aggregate structure, making the system easily adaptable to different application profiles so that the end user has a broad variety of advanced primers from which to choose. When cured, the at least one thermosetting non-self-emulsifying resin composition improves the anti-corrosive properties of the formulation and reduces the need for additional corrosion-inhibitors. For various applications, e.g. interior coatings, an inventive aqueous-based primer composition which does not comprise additional corrosion inhibitors can be applied to exposed surfaces, still protecting, in a sufficient manner, said exposed surfaces against corrosion. Additionally the mechanical properties of the cured product of the inventive aqueous-based composition, regarding flexibility, UV-resistance, adhesion and scratch resistance are enhanced by the non-self-emulsifying resin composition.

Most preferably the at least one thermosetting, non-self-emulsifying resin may ordinarily be epoxy based. The epoxy resin may include mono-functional epoxy compounds, such as $C_4$-$C_{28}$ alkyl glycidyl ethers; $C_2$-$C_{28}$ alkyl- and alkenyl-glycidyl esters; and $C_1$-$C_{28}$ alkyl-, mono-phenol glycidyl ethers. The epoxy resin may also include multifunctional epoxy resins, such as $C_1$-$C_{28}$ alkyl-, poly-phenol glycidyl ethers; polyglycidyl ethers of pyrocatechol, resorcinol, hydroquinone, 4,4'-dihydroxydiphenyl methane (or bisphenol F, such as RE-303-S or RE-404-S available commercially from Nippon Kayaku, Japan), 4,4'-dihydroxy-3,3'-dimethyldiphenyl methane, 4,4'-dihydroxydiphenyl dimethyl methane (or bisphenoi A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphyenyl)methane; polyglycidyl ethers of transition metal complexes; chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; phenol novolac epoxy resin; cresol novolac epoxy resin; and combinations thereof.

Among the commercially available epoxy resins suitable for use in the present invention are polyglycidyl derivatives of phenolic compounds, such as those available under the tradenames EPON 825, EPON 826, EPON 828, EPON 1001, EPON 1007 and EPON 1009 or waterborne dispersions under the tradenames EPI-REZ 3510, EPI-REZ 323, EPI-REZ 3515, EPI-REZ 3520, EPI-REZ 3522, EPI-REZ 3540 or EPI-REZ 3546 from Resolution Performance Products; DER 331, DER 332, DER 383, DER 354, and DER 542 from Dow Chemical Co.; GY285 from Vantico, Inc.; and BREN-S from Nippon Kayaku, Japan. Other suitable epoxy resins include polyepoxides prepared from polyols and the like and polyglycidyl derivatives of phenol-formaldehyde novolacs, the latter of which are available commercially under the tradenames DEN 431, DEN 438, and DEN 439 from Dow Chemical Company and a waterborne dispersion ARALDITE PZ 323 from Vantico.

Cresol analogs are also available commercially such as ECN 1273, ECN 1280, ECN 1285, and ECN 1299 or waterborne dispersions ARALDITE ECN 1400 from Vantico, Inc. SU-8 and EPI-REZ 5003 are bisphenol A-type epoxy novolacs available from Resolution Performance Products. Epoxy or phenoxy functional modifiers to improve adhesion, flexibility and toughness, such as the HELOXY brand epoxy modifiers 67, 71, 84, and 505, and the EPI-REZ brand waterborne dispersions, such as EPI-REZ 3519 from Resolution Performance Products or the PAPHEN brand waterborne phenoxy resins, such as PKHW-34 and PKHW-35 from Phenoxy Specialties can be used to improve performance. When used, the epoxy or phenoxy functional modifiers may be used in an amount of about 1:1 to about 5:1 with regard to the heat curable resin.

Other commercially available epoxy resins suitable for use in the present invention are cycloaliphatic epoxy resins such as UVR 6110 from Dow Chemical or chelate-modified epoxy resins comprising phosphonic acid groups such as EP 49 10N, EP-49-20 and EP-49-55C from Adeka.

Of course, combinations of the different epoxy resins are also desirable for use herein. Oftentimes the epoxy resin is a bisphenol A epichlorohydrin-based epoxy resin. The epoxy resin desirably includes as noted above a bisphenol A epichlorohydrin-based epoxy resin. The epoxy resin may also be a mixture of solid epoxy resins, one of which having an epoxy functionality of about 5.5 or less and another of which having an epoxy functionality of 6 or more. The epoxy resin may also be a mixture of liquid epoxy resins with epoxy functionality of 2 to 4.

Desirably, the epoxy resin within the aqueous dispersion should comprise from 30 to 60 percent by weight of a solid epoxy resin having an epoxy functionality of from 1.8 to 4 and an epoxy equivalent weight ("EEW") of from 100 to 200; from 40 to about 70 percent by weight of an epoxy resin having an epoxy functionality of from 1.8 to about 4 and an epoxy equivalent weight of from about 200 to about 800; and from 5 to about 20 percent by weight of a solid epoxy resin having an epoxy functionality of 1.8 or more and having an epoxy equivalent weight of from about 1000 to about 8000—such that the weight percents total 100 percent based on the total weight of the epoxy component. DEN 431, DEN 438, DEN 439, EPON 828, EPON 1002 and EPON 1007 are particularly desirable choices for use as thermosetting, non-self-emulsifying resins.

The aqueous-based primer composition includes from about 5 to about 90 wt %, such as about 20 wt % to about 70 wt %, of the at least one thermosetting, self-emulsifying resin composition and about 0.5 wt % to about 60 wt %, such as about 1 to about 20 wt %, of the at least one thermosetting, non-self-emulsifying resin composition.

Preferably the weight ratio of the at least one thermosetting, self-emulsifying resin composition and the at least one thermosetting, non-self-emulsifying resin composition ranges from 99.9:0.1 to 60:40, by preference from 99:1 to 80:20, particularly preferably from 95:5 to 85:15.

At least one curative for the curable primer composition may be preferably chosen from a host of classes of nitrogen-containing compounds. One such class of nitrogen-containing compounds includes those having at least two amine functional groups available for reaction.

For instance, a nitrogen-containing compound having at least two primary and/or secondary amines may be represented as being within the following structure I:

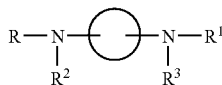

I where R, $R^1$, $R^2$, and $R^3$ may be the same or different and may be selected from hydrogen, $C_{1-12}$ alkyl, $C_{1-12}$ alkenyl, $C_{5-12}$ cyclo or bicycloalkyl, $C_{6-18}$ aryl, and derivatives thereof, and

is $C_{6-18}$ arylene, and derivatives thereof, and oxidized versions thereof. Preferably, at least one of R, $R^1$, $R^2$, and $R^3$ is hydrogen.

Within structure I are a variety of materials that may be used herein, for instance, the aromatic diamines represented by structure II:

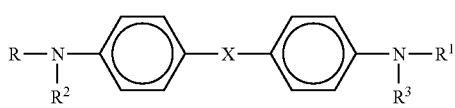

II where X is $CH_2$, $CR_2$, NH, NR, O, S, or $SO_2$; and R, $R^1$, $R^2$, and $R^3$ are as described above.

Within structure II are those compounds within structure III:

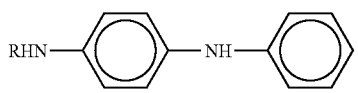

III where R is as defined above. In addition, the oxidized version (shown below as structure IIIa) of structure III is also within the scope of the invention.

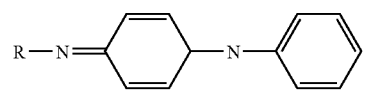

IIIa

Within structure III is structure IIIb below, N-2-pentyl-N'-phenyl-p-phenylene diamine, which may also be used.

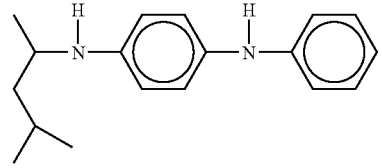

IIIb

This phenylene diamine is believed to be available from Uniroyal Chemical Co., under the tradename FLEXZONE 7L.

Other specific examples within structure III include N-phenyl-N'-(1,3-dimethylbutyl)-p-phenylenediamine; N-phenyl-N'-isopropyl-p-phenylenediamine; N-phenyl-N'-(1-methylheptyl)-p-phenylenediamine; N-phenyl-N'-cyclohexyl-p-phenylenediamine; mixed diaryl-p-phenylenediamines; N,N'-diphenyl-p-phenylenediamine; N,N'-di-beta-naphthyl-p-phenylenediamine; N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; N-phenyl-N'-p-toluenesulfonyl-p-phenylenediamine; N-phenyl-N'-alkyl-p-phenylenediamines; dialkyl-p-phenylenediamines; N,N'-bis(1-cyclohexyl-1-ethyl)-p-phenylenediamine; N,N'-di(sec-hexyl)-p-phenylenediamine; N-(1,3-dimethylbutyl)-N'-(1,4-dimethylpentyl)-p-phenylenediamine; N-(sec-hexyl)-N'-(sec-alkyl)-p-phenylenediamines; N,N'-di(1,4-dimethylpentyl)-p-phenylenediamine; 2,4,6-tris(N-alkyl-p-phenylenediamino)-1,3,5-triazine; 6-ethoxy-1,2-dihydro-2,2,4-trimethylquinoline; and combinations thereof. See U.S. Pat. No. 5,252,737 (Stern), U.S. Pat. No. 4,297,269 (Merten), U.S. Pat. No. 5,126,385 (Wheeler) and U.S. Pat. No. 5,068,271 (Wheeler).

More specific materials within structure I further include those within structure IV:

IV where $R^4$ and $R^5$ are hydrogen, $C_{5-12}$ alkyl, $C_{5-8}$ cycloalkyl, $C_{7-15}$ phenylalkyl, or $C_{8-10}$ aryl, with or without substitution by one or two $C_{1-4}$ groups.

Other nitrogen-containing compounds include

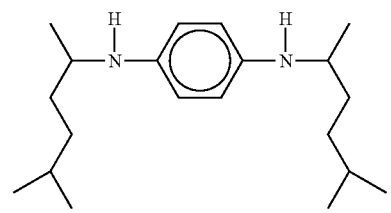

V

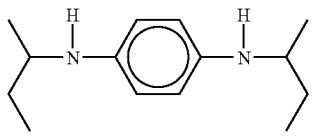

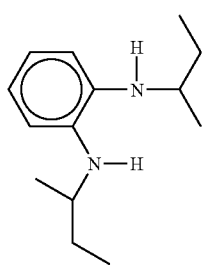

Structure V (UNILINK 7100) is N,N'-bis-4-(5-methyl-2-butyl)-p-phenylene diamine, structure VI (UNILINK 4100) is N,N'-bis-4-(2-butyl)-p-phenylene diamine, and structure VII (UNILINK 4102) is N,N'-bis-4-(2-methylpropyl)-o-phenylene diamine.

Other commercially available phenylene diamine cure accelerators include those available commercially from Flexsys under the tradename SANTOFLEX, such as SANTOFLEX 77PD and SANTOFLEX 715 PD, the latter of which being a mixture of

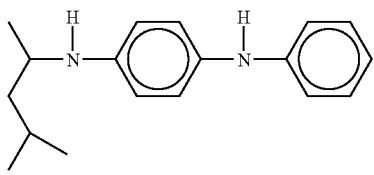

N-phenyl-N'-(1,3-dimethylbutyl)-p-phenylenediamine (CAS No. 793-24-8) (also called SANTOFLEX 6PPD or FLEXZONE 7, depending on the supplier),

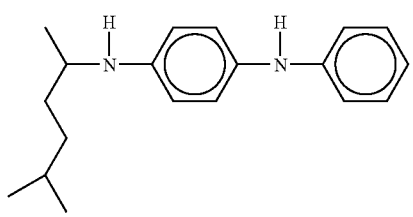

N-phenyl-N'-(1,4-dimethylpentyl)-p-phenylenediamine (CAS No. 3081-01-4), and

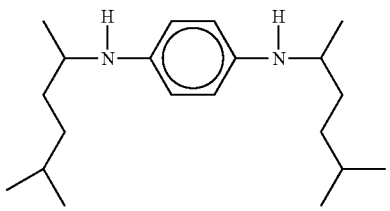

N,N'-bis(1,4-dimethylpentyl)-p-phenylene diamine (CAS No. 3081-14-9) (also called FLEXZONE 4L or SANTOFLEX 77PD, again depending on the supplier). The commercially available phenylene diamines may be obtained under one or more of the following tradenames: SUMILIZER from Sumitomo, such as BPA, BPA-M1, 4A, and 4M, and UOP from Crompton, such as UOP 12, UOP 5, UOP 788, UOP 288, UOP 88, UOP 26, UOP 388, UOP 588, UOP 36 and UOP 688.

Other diamines includes aromatic diamines, such as trialkyl substituted benzene diamines, such as diethyl toluene diamines (CAS No. 68479-98-1), available commercially under the tradename ETHACURE 100 from Albemarle Corporation.

The nitrogen-containing compounds also include aza compounds (such as di-aza compounds or tri-aza compounds), examples of which include:

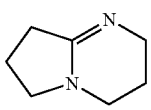

1,5-Diazabicyclo[4.3.0]non-5-ene

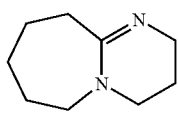

1,8-Diazabicyclo[5.4.0]undec-5-ene (DBU)

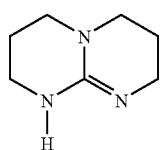

1,5,7-Triazabicyclo[4.4.0]dec-5-ene and the bicyclo mono- and di-aza compounds:

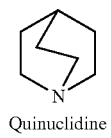

Quinuclidine

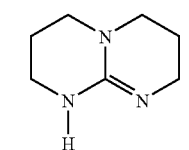

1,4-Diazabicyclo[2.2.2]octane

The nitrogen-containing compounds further include the aliphatic polyamines: diethylenetriamine, triethylenetetraamine, diethylaminopropylamine; the aromatic polyamines: benzyl dimethylamine, m-xylenediamine, diaminodiphenylamine and quinoxaline; and the alicyclic polyamines: isophoronediamine and menthenediamine.

Examples of still other nitrogen-containing compounds include imidazoles, such as isoimidazole, imidazole, alkyl substituted imidazoles, such as 2-ethyl-4-methylimidazole, 2,4-dimethylimidazole, butylimidazole, 2-heptadecenyl-4-methylimidazole, 2-methylimidazole, 2-undecenylimidazole, 1-vinyl-2-methylimidazole, 2-undecylimidazole, 2-heptadecylimidazole, 2-phenylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition products of an imidazole and methylimidazole and addition products of an imidazole and trimellitic acid, 2-n-heptadecyl-4-methylimidazole and the like, generally where each alkyl substituent contains up to about 17 carbon atoms and desirably up to about 6 carbon atoms, aryl substituted imidazoles, such as phenylimidazole, benzylimidazole, 2-methyl-4,5-diphenylimidazole, 2,3,5-triphenylimidazole, 2-styrylimidazole, 1-(dodecyl benzyl)-2-methylimidazole, 2-(2-hydroxyl-4-t-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethylaminophenyl)-4,5-diphenylimidazole, 2-(2-hydroxyphenyl)-4,5-diphenylimidazole, di(4,5-diphenyl-2-imidazole)-benzene-1,4,2-naphthyl-4,5-diphenylimidazole, 1-benzyl-2-methylimidazole, 2-p-methoxystyrylimidazole, and the like generally where each aryl substituent contains up to about 10 carbon atoms and desirably up to about 8 carbon atoms. Commercially available examples include EPI-CURE P-101, EPI-CURE P-104 and EPI-CURE P-301, all of which are available commercially from Resolution Performance Products, or AJICURE PN-23 and AJICURE MY-24, each of which is available commercially from Ajinomoto Fine Chemicals, Tokyo, Japan, which of course can be used.

Bis(para-amino-cyclohexyl)methane is a particularly desirable nitrogen-containing compound for use herein [(PACM) CAS No. 1761-71-3, available commercially from Air Products], and OMICURE 33DDS, 3,3'-diaminodiphenylsulfone, CAS No. 599-61-1, commercially available from CVC Specialty Chemical.

Other desirable nitrogen-containing compounds for use herein include 4,4'-diaminodiphenylsulfone, dicyandiamide, and 4,4'-methylenebis(cyclohexylamine) and melamine-formaldehyde polymers including the commercially available ones RESIMENE 745, RESIMENE 747 and RESIMENE AQ 7550 from Solutia, St. Louis, Mo.

Other preferred nitrogen-containing compounds for use herein are obtained by the reaction of aromatic diamines, preferably xylylenediamine, with epichlorhydrin, commercially available from Cognis under the trade name Waterpoxy 801 or from Mitsibushi under the trade name Gaskamine-328.

Of course, combinations of these various nitrogen-containing compounds are also desirable for use in the compositions of the present invention.

Another curative for the curable primer composition may be preferably chosen from the group consisting of polyamine including the commercially available ones Waterpoxy 603, Waterpoxy 751 from Cognis, Germany.

The at least one curative for the epoxy resin is typically used in an amount that yields about 25 to about 100% amine equivalents compared to the epoxy equivalents, with about 65 to about 100% amine equivalents compared to the epoxy equivalents being particularly desirable.

In a preferred embodiment the aqueous-based primer composition further comprises at least one component selected from the group consisting of catalysts, thickeners, emulsifiers, toughening agents, adhesion promoters, wetting agents, pigments, dyes and/or combinations thereof.

A catalyst, such as a urea-based one, can preferably be included to promote the cure of epoxy resins. When the catalyst is a urea-based one, the catalyst may be selected from 2,4-toluene bis(dimethyl urea) (CAS No. 17526-94-2), available commercially from CVC Specialty Chemical under the tradename OMICURE U-24; cycloaliphatic bisurea, available commercially from CVC Specialty Chemical under the tradename OMICURE U-35; 4,4-methylene bis (phenyldimethylurea) (CAS No. 10097-09-3), available commercially from CVC Specialty Chemical under the tradename OMICURE U-52; and combinations thereof. Other useful catalysts include amine-blocked toluenesulfonic acids, such as the amine-blocked p-toluenesulfonic acids available commercially under the tradenames NACURE 2500, NACURE 2547 and NACURE XC-2211 from King Industries.

In a further preferred embodiment of the invention the aqueous-based primer composition additionally comprises at least one corrosion inhibitor preferably comprising i. one or more of an organic zinc salt, an alkyl-ammonium salt or cycloalkyl-ammonium salt of a mercapto- and/or thio-compound or an alkyl-substituted derivative thereof; and/or ii. the combination of an anodic corrosion inhibitor and a cathodic corrosion inhibitor, provided the anodic corrosion inhibitor is not chromate, and/or iii. one or more of an active ingredient.

In a desirable embodiment of the aqueous-based primer composition the at least one thermosetting, self-emulsifying epoxy resin composition, the at least one thermosetting, non-self-emulsifying resin composition, the at least one curative and the at least one corrosion inhibitor are dispersed in water in an amount from 1 to about 80 percent by weight, preferably from 10 to about 55 percent by weight.

The above mentioned active ingredient is preferably selected from the group of anti-corrosion compounds consisting of water soluble corrosion inhibitors, copper complexing agents, anti-corrosion pigments or pigments containing lead, phosphates, tungstate, zirconate or iron and combinations thereof.

Most preferably the active ingredient is selected from, but are not limited to, substituted or unsubstituted aryl, heteroaryl, such as 4-amino-salicylic acid, 5-amino-salicylic acid, phosphonic and diphosphonic acid derivatives, like hydroxyethane-1,1 diphosphonic acid tetrasodium ($C_2H_4O_7P_2Na_4$), hydroxyethane-1,1-diphosphonic acid ($C_2H_8O_7P_2$), hydroxyethane-1,1-diphosphonic acid disodium ($C_2H_6Na_2O_7P_2$), commercially available under the tradenames Turpinal® 4NL, SL, 2NZ, 4NP from Solutia's Dequest or Cognis, esters of gallic acid, such as tannic acids bounded to glucose, $C_{76}H_{52}O_{46}$, commercially available by Sigma-Aldrich, a mixture of 5-nonylsalicylaldoxime and 2-hydroxy-5-nonylacetophenone oxime in hydrocarbon or kerosene, such as Lix 973N-C, commercially available from Cognis, imidazol derivatives, like 2-ethyl-4-methylimidazole, triazole derivatives, like methyl-1H-benzotriazole or derivatives from glucose or fructose or $K_3[Fe(CN)_6]$, pigments containing lead, such as $Ca_2PbO_4$, $PbSiO_3*3PbO/SiO_2$, $2PbO*PbHPO_3*0.5\ H_2O$, pigments containing phosphates, such as zinc phosphates $Zn_3(PO_4)_2*xH_2O$, polyphosphates, such as $Al(H_2PO_4)_3$, chromium phosphates such as $CrPO_4*3H_2O$, pigments containing tungstate or zirconate or iron, such as $2CaO*Fe_2O_3$, $CaO*Fe_2O_3$, $Zn(Mg)O*Fe_2O_3$ or other pigments such as $Zn(Ca,Al)$-polyphosphate/$Ba(Zn,Mg,Al)$-metaborate or blends of Ca/Zn/phosphate/phosphite/borate and combinations thereof.

The at least one corrosion inhibitor is preferably based on one or more of an organic zinc salt, an alkyl-ammonium salt or cycloalkyl-ammonium salt of mercapto- and/or thio-compound or an alkyl-substituted derivative thereof.

In another preferred embodiment the at least one corrosion inhibitor comprises the combination of an anodic corrosion inhibitor and a cathodic corrosion inhibitor, provided the anodic corrosion inhibitor is not chromate, and one or more of an organic zinc salt, an alkyl-ammonium salt or cycloalkyl-ammonium salt of a mercapto- and/or thio-compound or an alkyl-substituted derivative thereof, an example of which is commercially available under the tradename WAYNCOR® 204.

As noted above, the organic zinc salt is preferably used, but other metal salt may also be used instead, such as magnesium, calcium, and the like.

Preferably, the at least one corrosion inhibitor, when provided as solid and/or liquid particles, have a particle size which is less than the primer layer thickness of a coating and provide less corroding surface. Such corrosion inhibitors are preferably anti-corrosion pigments.

Corrosion pigments of that kind are preferably anti-corrosion pigments or pigments containing lead, for example $Ca_2PbO_4$, $PbSiO_3*3PbO/SiO_2$, $2PbO*PbHPO_3*0.5H_2O$, pigments containing phosphates, such as zinc phosphates $Zn_3(PO_4)_2*xH_2O$, polyphosphates, such as $Al(H_2PO_4)_3$, chromium phosphates such as $CrPO_4*3H_2O$, pigments containing tungstate or zirconate or iron, such as $2CaO*Fe_2O_3$, $CaO*Fe_2O_3$, $Zn(Mg)O*Fe_2O_3$ or other pigments such as $Zn(Ca,Al)$-polyphosphate/$Ba(Zn,Mg,Al)$-metaborate or a blend of Ca/Zn/phosphate/phosphite/borate, cerium molybdate, strontium tungstate or Wayncor® 204, and the like. Additionally, the ground pigment maybe any pigment, such as yellow pigments like DCC1202 Diarylide Yellow, which is commercially available from Dominion Colour Corp.

The anodic corrosion inhibitor carries a negative charge, and when placed in an electrochemical cell migrates toward the anode. The anodic corrosion inhibitor in accordance with the present invention is preferably selected from oxides of vanadium, molybdenum, tungsten, and zirconium. Of course, combinations of these oxides may also be used as the anodic corrosion inhibitor.

The cathodic corrosion inhibitor carries a positive charge, and when placed in an electrochemical cell migrates toward the cathode. The cathodic corrosion inhibitor is preferably a cation of a rare earth element, examples of which include compounds of neodymium, cerium and lanthanum, such as cerium phosphate. Of course, combinations of these rare earth elements may also be used as the cathodic corrosion inhibitor.

The anodic corrosion inhibitor is ordinarily used in an amount within the range of about 1 to about 15 wt % based on the total weight of the solids content of the primer composition.

The cathodic corrosion inhibitor is ordinarily used in an amount within the range of about 1 to about 10 wt % based on the total weight of the solids content of the primer composition.

When the anodic corrosion inhibitor and the cathodic corrosion inhibitor are combined, oftentimes the vanadium, molybdenum, zirconium and tungsten of the anodic corrosion inhibitor and the rare earth element of the cathodic corrosion inhibitor may dissociate from their respective counterions and associate with one another. Thus, contemplated within the scope of the present invention is the combination of the anodic corrosion inhibitor and the cathodic corrosion inhibitor as an individual ionic compound, such as for example cerium molybdate.

The preferred corrosion inhibitor component is further comprised of one or more of an organic zinc salt, an alkyl-ammonium salt or cycloalkyl-ammonium salt of a mercapto- and/or thio-compound or an alkyl-substituted derivative thereof, an example of which is commercially available under the tradename WAYNCOR 204. WAYNCOR 204, a product whose description is exemplified in U.S. Pat. No. 6,139,610 (Sinko), is a corrosion inhibitor composition for application to a metal substrate which includes a film-forming organic polymer component and a dispersed pigment phase of a stable unitary hybrid which contains organic and inorganic solid phase constituents interfaced at a micro-crystalline level, which are inseparable by physical separation procedures and which display uni-phase behavior. The inorganic solid phase includes a cation selected from Zn, Al, Mg, Ca, Sr, Ti, Zr, Ce, and Fe and an anion selected from phosphates, polyphosphates, phosphites, molybdates, silicates, and cyanamides. The organic phase includes zinc or alkyl-ammonium salts of organic mercapto- and thio-compounds or their alkyl-substituted derivatives, such as mercaptobenzothiazole, mercaptothiazoline, mercaptobenzimidazole, mercaptoimidazole, 2,5-dimercapto-1,3,4-thiodiazole, 5,5-dithio-bis(1,3,4-thiadiazole-2(3H)-thione, mercaptobenzoxazole, mercaptothiazole, mercaptotriazole, mercaptopyrimidine, mercaptopyridine, mercaptoquinoline, alkyl- and cyclo-alkyl mercaptanes, N-alkyl- or N-cycloalkyl-dithiocarbamates, O-alkyl or O-cycloalkyl-dithiocarbonates, O,O-dialkyl- and O,O-dicycloalkyl-dithiophosphates. U.S. Pat. No. 6,139,610 is expressly incorporated herein by reference.

In a desirable embodiment of the invention the at least one corrosion inhibitor includes one or more of zinc cyanamide, zinc phosphate, zinc 2,5-dimercapto-1,3,4-thiadiazolate, zinc molybdate and cerium phosphate, and more particularly either the combination of cerium molybdate, zinc cyanamide, zinc phosphate and zinc-2,5-dimercapto-1,3,4-thiadiazolate, or the combination of zinc molybdate, zinc cyanamide, cerium phosphate and zinc-2,5-dimercapto-1,3,4-thiadiazolate. The invention also encompasses the corrosion inhibitor as so described.

In a preferred embodiment the at least one corrosion inhibitor of an organic zinc salt, an alkyl-ammonium salt or cycloalkyl-ammonium salt of mercapto- and/or thio-compound or an alkyl-substituted derivative thereof and/or the combination of cathodic and anodic corrosion inhibitor and/or the active ingredients provides a particle size within the range from about 5 nm to about 100 μm.

The particle size can be measured by dynamic light scattering with microtrac UPA 150 ultrafine particle analyzer from Honeywell, wherein the term "particle size" is defined as above.

In an additional desirable embodiment the at least one corrosion inhibitor of an organic zinc salt, an alkyl-ammonium salt or cycloalkyl-ammonium salt of mercapto- and/or thio-compound or an alkyl-substituted derivative thereof and/or the combination of cathodic and anodic corrosion inhibitor and/or the active ingredients provide a particle size which is less than the primer layer thickness of a coating. From a particle size distribution standpoint depending on the application profile preferably 95% of the pigments have a particle size less than 50 µm, more preferably 30 µm and most preferably 99% of the particles have a particle size less than 25 µm, or for other application preferably 95% of the pigments have a particle size less than 6 µm, more preferably 5 µm and most preferably 99% of the particles have a particle size less than 4 µm, as measured by dynamic light scattering with microtrac UPA 150 ultrafine particle analyzer from Honeywell, wherein the term "particle size" is defined as above. Corrosion inhibitors of that kind are preferably pigments, such as Wayncor® 204 or Cerium molybdate. Corrosion pigments of that size are available via fine grinding.

The micro-milled particles, as noted above, enhance dispersibility of the particles in primers, thus sedimentation of the particles is reduced. Dispersions with micro-milled Wayncor® 204 or cerium have a slower sedimentation performance comparing to dispersions of non-grinned Wayncor® 204 or cerium molybdate. When agitating the dispersions and subsequently observing the sedimentation, the micro-milled particles dispersions provide a sedimentation performance which is preferably equal or greater than 15 hours, more preferably equal or greater than 24 hours. Whereas dispersions with non-grinned particles show a sedimentation within 10 minutes.

The at least one corrosion inhibitor may be used in an amount of about 0.001 to about 20 wt %, such as about 0.5 to 15 wt %, desirably about 1 to about 10 wt %, preferably about 1 to about 8 wt %, based on the total primer composition.

In addition, a variety of other additives may be included, such as surfactants, which include but are not limited to wetting agents, dispersing agents, grinding agents, and defoamers.

Examples of the surfactants include those available from Air Products under the tradename SURFYNOL, such as 2205, 420, 440, 465, 485, FS-80, FS-85, DF-37, TG, and GA; those available from BYK-Chemie, such as under the BYK tradename, like BYK-019, BYK-021, BYK-022, BYK-023, BYK-024, BYK-025, BYK-028, BYK-044, BYK-151, BYK-155, BYK-156, BYK-345, BYK-346, BYK-348, BYK-380, BYK-381, or the DISPERBYK tradename, like DISPERBYK-181, DISPERBYK-183, DISPERBYK-184, DISPERBYK-185, DISPERBYK-190, DISPERBYK-191, and DISPERBYK-192; and those available from the Union Carbide division of Dow Chemical under the TRITON tradename, such as TRITON X-100, X-114, X-305, X-405, and N-101.

Additives may also include rheology modifiers such as those available from Rheox under the tradename BENTONE, such as EW, LT, SD-1, and SD-2; the THIXCINE tradename, such as THIXCINE GR, THIXCINE R, and THIXATROL NR-22; or under the tradename RHEOLATE, such as 210, 255, 300, 310, 350, 2000, 2001, and 5000.

Others additives that may desirably be included in the inventive primer compositions include acrylic flow agents such as COROC A-2678-M from Cook Composites and Polymers Company and MODAFLOW AQ-3025 from Solutia.

Additives may also include anti-foaming agents such as FOAMASTER EXP-63, FOAMASTER G, FOAMASTER H and FOAMASTER NS-1 from Henkel Corporation; and SURFYNOL DF, DF-62, DF-70, DF-75, DF-110D and DF-110L from Air Products.

Additives may also include fillers such as the various forms of silica and alumina; other metal oxides such as titanium oxide and iron oxides; tougheners; and colorants such as dyes and pigments to provide a desired color to the primer, like DCC1202 Diarylide Yellow.

In a preferred embodiment the aqueous-based primer composition of the present invention is self stable for a period of time of up to three months for 1K Systems and up to 2 hours for 2K Systems under ambient temperature without loss of ability to be applied to a surface, preferably to a metal surface. The inventive aqueous-based primer composition is preferably cured in about 1 second to about 14 days within the temperature range of about 15° C. to about 250° C. and when cured exhibits resistance to organic solvents.

The subject of the invention also includes the cured product of the inventive aqueous-based primer composition.

The inventive aqueous-based primer composition and and/or the cured product of the aqueous-based primer composition of the present invention can be used for inhibition of corrosion on metal surfaces and/or for providing a long lasting resistance to metal surfaces against corrosion.

The invention also relates to the use of the inventive aqueous-based primer composition as a primer for adhesive bonding systems on metal surfaces and/or as a primer for coatings on metal surfaces For various applications, e.g. interior coatings, the cured product of the inventive aqueous-based primer composition preferably does not have to be coated with an additional topcoat. The anti-corrosion properties of said cured product are sufficient to protect exposed metal surfaces against corrosion. The primer can be used itself for coatings applications as a topcoat.

Metal surfaces that may benefit from the present invention include aluminum or aluminum alloys, such as 2024T3 Bare and Clad, and Clad 6061 and 7075 or any light metal. Other surfaces that may benefit include steel, galvanized steel, iron, galvanized iron, copper, zinc, zinc alloy plated steel, cold rolled steel, Zn/Mg plated steel, magnesium, titanium alloys thereof, alloys of stainless steel, such as AMS3SS, and high strength alloys recently developed for structural aerospace applications.

The inventive aqueous-based primer composition may be applied to such surfaces by any of a variety of coating techniques, including spray coating (conventional or electrostatic), pour coating, dip coating, brushing, and the like. Once applied to the substrate, the inventive aqueous-based primer composition can be air dried and then the primer-applied substrate placed in an air-flow through oven.

Thus, the invention also relates to a primed substrate comprising at least the cured product of the inventive aqueous-based primer composition and a substrate, preferably selected from the group consisting of steel, galvanized steel, iron, galvanized iron, aluminum, copper, zinc, zinc alloy plated steel, cold rolled steel, Zn/Mg plated steel, titanium, cadmium, magnesium and alloys thereof.

In a preferred embodiment the cured product of the aqueous-based primer composition forms a film on said primed substrate and the layer thickness of said film is within a range from about 10 µm to about 50 µm, preferably from about 15 µm to about 25 µm. The layer thickness was determined according to ISO 2808.

The primed substrate may be used in conjunction with an epoxy resin composition for application, which epoxy resin composition is in the form of a film.

Such epoxy adhesive film ordinarily cure at a temperature of 120° C. and provides service performance in the 80° C. to 120° C. performance range or a film that cures at a temperature of 175° C. and provides service performance at 175° C. for periods of time at 175° C. for up to about 1,000 hours. Examples of such adhesive films include in the former case EA9696 from Loctite Aerospace, Bay Point, Calif. and AF163-2 from 3M, Minneapolis, Minn.; examples of films used in the latter case include EA9657 from Loctite Aerospace, Bay Point, Calif. and FM377 from Cytec Industries, Stamford, Conn. In addition, various structural paste adhesives may be used with the inventive primer composition.

In another aspect of the invention, a bonded assembly is provided which includes two substrates aligned in a spaced apart relationship, each of which having an inwardly facing surface and an outwardly facing surface, between the inwardly facing surface of each of the two substrates is a bond formed by the inventive aqueous-based primer composition and a cured adhesive, such as those epoxy adhesives noted above. In this aspect, the substrates may be constructed of metal or a composite.

The invention also relates to a coated assembly comprising at least a cured aqueous-based primer composition, a substrate and a topcoat.

The above mentioned substrates may be constructed of metal, preferably selected from the group consisting of steel, galvanized steel, iron, galvanized iron, aluminum, copper, zinc, zinc alloy plated steel, cold rolled steel, Zn/Mg plated steel, titanium, cadmium, magnesium and alloys thereof, or a composite.

Another aspect of the invention is a method of manufacturing an inventive aqueous-based primer composition, wherein at least one curative of the present invention is added to an aqueous dispersion comprising at least one thermosetting, self-emulsifying epoxy resin composition of the present invention, at least one thermosetting, non-self-emulsifying resin composition of the present invention, and optionally at least one corrosion inhibitor of the present invention.

The present invention will be more fully appreciated when viewed together with the examples.

EXAMPLES

Primer formulations were prepared from the noted components in the amounts listed in Table 1, the relative amounts of the respective components being set forth on a weight percent basis.

The synthesis of thermosetting self-emulsifying epoxy resins is described in U.S. Pat. No. 6,506,821.

The synthesis of the self-emulsifying epoxy resin comprises first, the preparation of a solid resin and second, the preparation of the dispersion of the solid resin:
Step 1:
 592.52 g (3.4 eq) DEN431 and 154.02 g (0.07 eq) Jeffamine M2070 and 172.98 (1.5 eq.) bisphenol A and 0.69 g triphenylphosphine are mixed together and heated up to 155° C.-165° C. for about 2 hours. Then the mixture is cooled down to about <130° C. and 125.48 g ethoxypropanole is added to homogenize the mixture.
Step 2:
 1045 g of the obtained solid resin from step 1 is heated to 65° C. and 146.14 g of 65° C. warm distilled water is added. The mixture is stirred for 15 minutes. Afterwards the mixture is cooled down to 35° C. and the inversion from W/O to O/W emulsion is checked by taking a small sample of the emulsion and dissolving the sample in surplus water. Subsequently, 457.30 g of room tempered distilled water is slowly added until the viscosity of the mixture decreases. At that time the water is rapidly added. The mixture is then stirred 15 minutes without any further cooling and the product named EM 186 is filtered over a sieve (1000 microns). Depending on the amount of water added to the reaction mixture the solids content of EM 186 is from about 40 to 50 percent by weight.

The aqueous-based primer formulation set forth in Table 1 may be prepared with deionized as follows:
Deionized water comprising at least one self-emulsifying epoxy resin composition was placed in a vessel containing a mixer and stirred with high shear. At least one non-self-emulsifying epoxy resin composition was added to the vessel and the mixture was stirred for 1 to 10 minutes. Optionally at least one corrosion inhibitor and/or additives selected from the group consisting of defoamers, catalysis, thickeners, emulsifiers, toughening agents, adhesion promoters, wetting agents, pigments, dyes and/or combinations thereof were added. After stirring of 1 to 60 minutes, the curative was added and the mixture was optionally stirred for additional 1 to 60 minutes.

Table 1 shows different primer formulations.

The thermosetting self-emulsifying epoxy resin composition EM 186 was prepared as described above. DEN 431 and DEN 438 are derivatives of phenol-formaldehyde novolacs, commercially available from Dow Chemical Company and were used as sold in August 2006. Adeka EP49 10N is a modified epoxy resin, commercially available from Asahi Denka Europe GmbH and was used as sold in August 2006. The curative is selected from a group consisting of Waterpoxy 751, Waterpoxy 760 and Waterpoxy 801 and mixtures thereof. Waterpoxy 751 is an epoxy amine adduct, commercially available from Cognis Deutschland GmbH and was used as sold in August 2006. Waterpoxy 760 is an amine based curing agent in water solution, commercially available from Cognis Deutschland GmbH and was used as sold in August 2006. Waterpoxy 801 is obtained by the reaction of aromatic diamines with epichlorhydrin, commercially available from Cognis Deutschland GmbH and was used as sold in August 2006.

Molywhite 101 is a basic zinc molybdate compound, commercially available form Molywhite Pigments Group and was used as sold in august 2006. Molywhite 501 is a calcium molybdate pigment, commercially available form Molywhite Pigments Group and was used as sold in august 2006. Molywhite MZAP contains basic calcium zinc phosphormolybdate, commercially available form Molywhite Pigments Group and was used as sold in August 2006. Shieldex are anti-corrosive pigments are based on calcium ion exchanged amorphous silica gel, commercially available from W. R. Grace & Co and were used as sold in August 2006. Wayncor 204 was already described above.

The inventive aqueous-based primer composition is applied to a metal surface and cured at 80° C. for 40 minutes.

Once the primer compositions were prepared, the performance of each such primer composition in inhibiting corrosion on certain substrates, according to ISO 7253 salt spray test and MEK test, was evaluated. The results are also recorded in Table 1.

The ISO 7253 salt spray test was performed on primed 2024T3 bare and clad aluminium, cold rolled steel (CRS) and ZE (electronically galvanized steel).

The MEK test was performed on primed 2024T3 bare and clad aluminium, CRS and ZE. Hereby, a swab was soaked with methyl-ethyl-ketone (MEK) and was rubbed with mechanical pressure across a cured primed surface. To meet the requirements in the MEK test the surface must not be rubbed off after 100 double rubs with the soaked swab.

Table 1 shows the performance of different primer compositions in inhibiting corrosion on certain substrates. Inventive aqueous-based primer compositions comprising at least one non-self-emulsifying epoxy resin composition surprisingly offer a significant improvement in corrosion resistance, even at low concentrations.

TABLE 1

| Self-emulsifying resin | | Non self-emulsifying resin | | Curative wt. (g) | Corrosion inhibiting Pigment | | Additive | | De-ionized water wt. (g) | TESTS | | |
|---|---|---|---|---|---|---|---|---|---|---|---|---|
| | wt. (g) | | wt. (g) | | | wt. (g) | | wt. (g) | | Substrate | MEK [dr] | SST |
| EM-186 | 27 | | 0.0 | 19 | | 0 | | 0 | 54 | Al2024 Clad | − | − |
| EM-186 | 27 | | 0.0 | 19 | | 0 | | 0 | 54 | Al2024 Bare | − | − |
| EM-186 | 27 | | 0.0 | 19 | | 0 | A | 0.5 | 53.5 | Al2024 Clad | − | − |
| EM-186 | 27 | | 0.0 | 19 | | 0 | A | 0.5 | 53.5 | Al2024 Bare | − | − |
| EM-186 | 33 | | 0.0 | 10 | | 0 | A | 0.5 | 56.5 | Al2024 Clad | n.d. | − |
| EM-186 | 33 | | 0.0 | 10 | | 0 | A | 0.5 | 56.5 | Al2024 Bare | n.d. | − |
| EM-186 | 34 | | 0 | 7.5 | | 0 | A | 0.6 | 57.9 | CRS | n.d. | − |
| EM-186 | 34 | | 0 | 7.5 | | 0 | A | 0.6 | 57.9 | ZE | n.d. | − |
| EM-186 | 33 | DEN 431 | 0.3 | 10 | | 0 | | 0 | 56.7 | Al2024 Clad | + | + |
| EM-186 | 33 | DEN 431 | 0.3 | 10 | | 0 | | 0 | 56.7 | Al2024 Bare | + | + |
| EM-186 | 31 | DEN 431 | 3.5 | 11 | | 0 | | 0 | 54.5 | Al2024 Clad | + | + |
| EM-186 | 31 | DEN 431 | 3.5 | 11 | | 0 | | 0 | 54.5 | Al2024 Bare | + | + |
| EM-186 | 31 | DEN 431 | 5.4 | 11 | | 0 | | 0 | 52.6 | Al2024 Clad | + | + |
| EM-186 | 31 | DEN 431 | 5.4 | 11 | | 0 | | 0 | 52.6 | Al2024 Bare | + | + |
| EM-186 | 28 | DEN 438 | 0.3 | 18 | | 0 | | 0 | 53.7 | Al2024 Clad | + | n.d. |
| EM-186 | 28 | DEN 438 | 0.3 | 18 | | 0 | | 0 | 53.7 | Al2024 Bare | + | n.d. |
| EM-186 | 33 | DEN 438 | 0.3 | 10 | | 0 | | 0 | 56.7 | Al2024 Clad | + | + |
| EM-186 | 33 | DEN 438 | 0.3 | 10 | | 0 | | 0 | 56.7 | Al2024 Bare | + | + |
| EM-186 | 32 | DEN 438 | 1.7 | 10 | | 0 | | 0 | 56.3 | Al2024 Clad | + | + |
| EM-186 | 32 | DEN 438 | 1.7 | 10 | | 0 | | 0 | 56.3 | Al2024 Bare | + | + |
| EM-186 | 31 | DEN 438 | 3.5 | 11 | | 0 | | 0 | 54.5 | Al2024 Clad | + | + |
| EM-186 | 31 | DEN 438 | 3.5 | 11 | | 0 | | 0 | 54.5 | Al2024 Bare | + | + |
| EM-186 | 29 | DEN 438 | 5.1 | 13 | | 0 | | 0 | 52.9 | Al2024 Clad | + | − |
| EM-186 | 29 | DEN 438 | 5.1 | 13 | | 0 | | 0 | 52.9 | Al2024 Bare | + | − |
| EM-186 | 33 | DEN 438 | 5.8 | 7.2 | | 0 | | 0 | 54 | Al2024 Clad | + | + |
| EM-186 | 33 | DEN 438 | 5.8 | 7.2 | | 0 | | 0 | 54 | Al2024 Bare | + | + |
| EM-186 | 32 | DEN 431 | 1.7 | 11 | | 0 | A | 0.5 | 54.8 | Al2024 Clad | + | + |
| EM-186 | 32 | DEN 431 | 1.7 | 10 | | 0 | A | 0.5 | 55.8 | Al2024 Bare | + | + |
| EM-186 | 32 | Adeka EP 49-10N | 1.7 | 10 | | 0 | A | 0.5 | 55.8 | Al2024 Clad | + | + |
| EM-186 | 32 | Adeka EP 49-10N | 1.7 | 10 | | 0 | A | 0.5 | 55.8 | Al2024 Bare | + | + |
| EM-186 | 31 | Adeka EP 49-10N | 3.5 | 11 | | 0 | A | 0.5 | 54 | Al2024 Clad | + | + |
| EM-186 | 31 | Adeka EP 49-10N | 3.5 | 11 | | 0 | A | 0.5 | 54 | Al2024 Bare | + | + |
| EM-186 | 31 | DEN 431 | 1.6 | 10 | | 0 | B | 3 | 54.4 | Al2024 Clad | + | + |
| EM-186 | 31 | DEN 431 | 1.6 | 10 | | 0 | B | 3 | 54.4 | Al2024 Bare | + | + |
| EM-186 | 32 | DEN 431 | 3.4 | 10 | | 0 | B | 2 | 52.6 | Al2024 Clad | + | + |
| EM-186 | 32 | DEN 431 | 3.4 | 10 | | 0 | B | 2 | 52.6 | Al2024 Bare | + | + |
| EM-186 | 31 | DEN431/DEN438 (1:1) | 1.6 | 10 | | 0 | A | 3 | 54.4 | Al2024 Clad | + | + |
| EM-186 | 31 | DEN431/DEN438 (1:1) | 1.6 | 10 | | 0 | A | 3 | 54.4 | Al2024 Bare | + | + |
| EM-186 | 32 | DEN431/DEN438 (1:1) | 3.4 | 10 | | 0 | A | 2 | 52.6 | Al2024 Clad | + | + |
| EM-186 | 32 | DEN431/DEN438 (1:1) | 3.4 | 10 | | 0 | A | 2 | 52.6 | Al2024 Bare | + | + |
| EM-186 | 31 | DEN431/Adeka EP49 10N (1:1) | 1.6 | 10 | | 0 | A | 3 | 54.4 | Al2024 Clad | + | + |
| EM-186 | 31 | DEN431/Adeka EP49 10N (1:1) | 1.6 | 10 | | 0 | A | 3 | 54.4 | Al2024 Bare | + | + |
| EM-186 | 32 | DEN431/Adeka EP49 10N (1:1) | 3.4 | 10 | | 0 | A | 2 | 52.6 | Al2024 Clad | + | + |
| EM-186 | 32 | DEN431/Adeka EP49 10N (1:1) | 3.4 | 10 | | 0 | A | 2 | 52.6 | Al2024 Bare | + | + |
| EM-186 | 32 | DEN431/Adeka EP49 10N (1:1) | 5.3 | 11 | | 0 | A | 0.5 | 51.2 | Al2024 Clad | + | + |
| EM-186 | 32 | DEN431/Adeka EP49 10N (1:1) | 5.3 | 11 | | 0 | A | 0.5 | 51.2 | Al2024 Bare | + | + |
| EM-186 | 32 | DEN 431 | 1.7 | 10 | Wayncor 204 | 0.3 | A | 0.5 | 55.5 | Al2024 Clad | + | + |

TABLE 1-continued

FORMULATIONS

| Self-emulsifying resin | | Non self-emulsifying resin | | Curative wt. (g) | Corrosion inhibiting Pigment | | Additive | De-ionized | TESTS | | |
|---|---|---|---|---|---|---|---|---|---|---|---|
| | wt. (g) | | wt. (g) | | | wt. (g) | wt. (g) | water wt. (g) | Substrate | MEK [dr] | SST |
| EM-186 | 32 | DEN 431 | 1.7 | 10 | Wayncor 204 | 0.3 A | 0.5 | 55.5 | Al2024 Bare | + | + |
| EM-186 | 32 | DEN 431 | 1.7 | 10 | Molywhite 101 | 0.3 A | 0.5 | 55.5 | Al2024 Clad | + | + |
| EM-186 | 32 | DEN 431 | 1.7 | 10 | Molywhite 101 | 0.3 A | 0.5 | 55.5 | Al2024 Bare | + | + |
| EM-186 | 32 | DEN 431 | 1.7 | 10 | Molywhite 501 | 0.3 A | 0.5 | 55.5 | Al2024 Clad | + | + |
| EM-186 | 32 | DEN 431 | 1.7 | 10 | Molywhite MZAP | 0.3 A | 0.5 | 55.5 | Al2024 Clad | + | + |
| EM-186 | 32 | DEN 431 | 1.7 | 10 | Molywhite MZAP | 2 A | 0.5 | 53.8 | Al2024 Clad | + | + |
| EM-186 | 31 | DEN 431 | 3.4 | 11 | Shieldex | 3.5 A | 0.5 | 54 | ZE | + | +/− |
| EM-186 | 31 | DEN 431 | 3.4 | 11 | Shieldex | 3.5 A | 0.5 | 54 | ZE | + | +/− |

Salt-spray test on CRS, ZE as primed substrates: >500 h = +, 250 h = +/−, <250 h = −
Salt-spray test on Al2024 as primed substrate: >1000 h = +, <1000 h = −
MEK test: > 100 double rubs = +, <100 double rubs = −
+ = substantially no corrosion, − = corrosion
Additive A and Additive B comprise a surfactant
n.d. not determined

What is claimed is:

1. An aqueous-based primer composition, comprising:
   a. at least one thermosetting, self-emulsifying epoxy resin composition obtained by reaction of (a) epoxy resin, (b) polyhydric phenol, and (c) an amine-epoxy adduct, wherein the amine-epoxy adduct is a reaction product of an aromatic polyepoxide with a polyoxyalkyleneamine;
   b. at least one thermosetting, non-self-emulsifying resin composition comprising a thermosetting, non-self-emulsifying epoxy based resin composition wherein the epoxy resin is selected from polyglycidyl derivatives of phenol-formaldehyde novolacs;
   c. water; and
   d. at least one curative;
   wherein a and b are present in amounts such that a weight ratio of the least one thermosetting, self-emulsifying epoxy resin composition to the at least one thermosetting, non-self-emulsifying resin composition is in a range of 32:5.3 to 60:40.

2. The aqueous-based primer composition of claim 1, wherein the at least one thermosetting, non-self-emulsifying resin composition further comprises benzoxazine resins, polyurethane resins, cyanoacrylate resins, acrylic resins, epoxy-acrylate resins, triazine resins, polyimide resins, acrylic ester resins, and/or combinations or copolymers thereof.

3. The aqueous-based primer composition of claim 2, wherein the at least one thermosetting, non-self-emulsifying resin composition further comprises a thermoplastic resin.

4. The aqueous-based primer composition of claim 1, wherein the at least one curative is a nitrogen-containing compound or a mixture of two or more different nitrogen-containing compounds.

5. The aqueous-based primer composition of claim 1, wherein the at least one thermosetting, self-emulsifying epoxy resin composition and the at least one thermosetting, non-self-emulsifying resin composition form an aggregate structure and particle size of said aggregate structure is within a range of about 5 nm to about 1 μm.

6. The aqueous-based primer composition of claim 1 additionally comprising at least one corrosion inhibitor comprising:
   i. one or more of an organic zinc salt, an alkyl-ammonium salt or cycloalkyl-ammonium salt of a mercapto- and/or thio-compound or an alkyl-substituted derivative thereof; and/or
   ii. the combination of an anodic corrosion inhibitor and a cathodic corrosion inhibitor, provided that the anodic corrosion inhibitor is not chromate, and/or
   iii. one or more of an active ingredient selected from the group of anti-corrosion compounds consisting of water soluble corrosion inhibitors, copper complexing agents, pigments containing tungstate or zirconate, and combinations thereof.

7. A primed substrate comprising a substrate surface and a primer layer deposited on said surface, the primer layer comprising the aqueous-based primer composition of claim 6 in a cured state and having a thickness of about 10 μm to about 50 μm, wherein particle size of the at least one corrosion inhibitor is less than the thickness of the primer layer.

8. A method of priming a substrate surface comprising:
   applying a coating of the aqueous-based primer composition of claim 1 to a substrate surface; and
   curing said coating to form a primer layer on the substrate surface.

9. A primer layer made according to claim 8.

10. A primed substrate comprising a substrate surface selected from the group consisting of steel, galvanized steel, iron, galvanized iron, aluminum, copper, zinc, zinc alloy plated steel, cold rolled steel, Zn/Mg plated steel, titanium, cadmium, magnesium and alloys thereof; and the primer layer according to claim 9 deposited on the substrate surface.

11. The primed substrate of claim 10, wherein the primer layer forms a film on said substrate surface and the layer thickness of said film is within a range from about 10 μm to about 50 μm.

12. A bonded assembly comprising:
   two substrates aligned in a spaced apart relationship, each of said substrates having an inwardly facing surface and an outwardly facing surface; and
   between the two inwardly facing surfaces is a bond formed by the primer layer according to claim 9 and a cured adhesive, whereby the two substrates are bonded to form a bonded assembly.

13. A coated assembly comprising a substrate, the primer layer according to claim 9 and a topcoat.

14. A method of manufacturing the aqueous-based primer composition of claim 1, wherein a curative is added to an aqueous dispersion comprising:
   a. the at least one thermosetting, self-emulsifying epoxy resin composition,
   b. the at least one thermosetting, non-self-emulsifying resin composition, and
   c. optionally at least one corrosion inhibitor.

15. A coated assembly comprising a substrate, the aqueous-based primer composition of claim 1 and a topcoat.

16. The aqueous-based primer composition of claim 1 additionally comprising 0.5 to 3 wt. % surfactant.

17. A method of making an aqueous-based primer composition comprising steps of:
   a) placing deionized water comprising at least one self-emulsifying epoxy resin composition obtained by reaction of (a) epoxy resin, (b) polyhydric phenol, and (c) an amine-epoxy adduct, wherein the amine-epoxy adduct is a reaction product of an aromatic polyepoxide with a polyoxyalkyleneamine, and no organic solvent in a vessel containing a mixer and stirring with high shear; and
   b) thereafter adding at least one non-self-emulsifying epoxy resin composition comprising a thermosetting, non-self-emulsifying epoxy based resin composition wherein the epoxy resin is selected from polyglycidyl derivatives of phenol-formaldehyde novolacs to the vessel and stirring for 1 to 10 minutes to form a mixture of resins from a) and b) having a micellar aggregate structure with a particle size within a range of about 5 nm to 200 nm; wherein the at least one thermosetting, self-emulsifying epoxy resin composition and the at least one thermosetting, non-self-emulsifying epoxy resin composition are present in amounts such that a weight ratio of the at least one thermosetting, self-emulsifying epoxy resin composition to the at least one thermosetting, non-self-emulsifying epoxy resin composition is in a range of 32:5.3 to 60:40; and
   c) after stirring of 1 to 60 minutes adding a curative to the mixture of resins from a) and b) and optionally stirring for additional 1 to 60 minutes;
   wherein the aqueous-based primer composition is free of volatile organic solvents.

18. A method of making an aqueous-based primer composition comprising steps of:
   a) mixing for 1 to 10 minutes a combination consisting of water, at least one thermosetting, self-emulsifying epoxy resin composition obtained by reaction of (a) epoxy resin, (b) polyhydric phenol, and (c) an amine-epoxy adduct, wherein the amine-epoxy adduct is a reaction product of an aromatic polyepoxide with a polyoxyalkyleneamine, and at least one thermosetting, non-self-emulsifying epoxy resin composition comprising a thermosetting, non-self-emulsifying epoxy based resin composition wherein the epoxy resin is selected from polyglycidyl derivatives of phenol-formaldehyde novolacs at high shear sufficient to form an aqueous dispersion containing a micellar aggregate structure formed by the at least one thermosetting, self-emulsifying epoxy resin composition and the at least one thermosetting, non-self-emulsifying epoxy resin composition said micellar aggregate structure having a particle size of 50 to 200 nm, wherein the at least one thermosetting, self-emulsifying epoxy resin composition and the at least one thermosetting, non-self-emulsifying epoxy resin composition are present in amounts such that a weight ratio of the at least one thermosetting, self-emulsifying epoxy resin composition to the at least one thermosetting, non-self-emulsify epoxy resin composition is in a range of 32:5.3 to 60:40;
   b) optionally adding at least one corrosion inhibitor and/or additives selected from the group consisting of defoamers, catalysts, thickeners, emulsifiers, toughening agents, adhesion promoters, wetting agents, pigments, dyes and/or combinations thereof to the aqueous dispersion and stirring; and
   c) after stirring of 1 to 60 minutes adding a curative to the aqueous dispersion and optionally stirring for additional 1 to 60 minutes; wherein the thermosetting self-emulsifying epoxy resin composition is obtained by first providing a solid epoxy resin, then providing a dispersion of said solid epoxy resin, wherein the dispersion of the solid epoxy resin comprises substantially no organic solvent and is dispersed in water and the aqueous-based primer composition is free of volatile organic solvents.

19. An aqueous-based primer composition, comprising:
   a. at least one thermosetting, self-emulsifying epoxy resin composition obtained b reaction of (a) epoxy resin, (b) polyhydric phenol, and (c) an amine-epoxy adduct, wherein the amine-epoxy adduct is a reaction product of an aromatic polyepoxide with a polyoxyalkyleneamine;
   b. at least one thermosetting, non-self-emulsifying resin composition comprising a thermosetting, non-self-emulsifying epoxy based resin composition wherein the epoxy resin is selected from polyglycidyl derivatives of phenolic compounds;
   c. water; and
   d. at least one curative;
   wherein a and b are present in amounts such that a weight ratio of the least one thermosetting, self-emulsifying epoxy resin composition to the at least one thermosetting, non-self-emulsifying resin composition is in a range of 32:5.3 to 60:40 and wherein the polyglycidyl derivatives of phenolic compounds comprise polyglycidyl ethers of novolacs.

20. The aqueous-based primer composition of claim 19, wherein the at least one thermosetting, non-self-emulsifying resin composition further comprises benzoxazine resins, polyurethane resins, cyanoacrylate resins, acrylic resins, epoxy-acrylate resins, triazine resins, polyimide resins, acrylic ester resins, and/or combinations or copolymers thereof.

21. The aqueous-based primer composition of claim 20, wherein the at least one thermosetting, non-self-emulsifying resin composition further comprises a thermoplastic resin.

22. The aqueous-based primer composition of claim 19, wherein the at least one curative is a nitrogen-containing compound or a mixture of two or more different nitrogen-containing compounds.

23. The aqueous-based primer composition of claim 19, wherein the at least one thermosetting, self-emulsifying epoxy resin composition and the at least one thermosetting, non-self-emulsifying resin composition form an aggregate structure and particle size of said aggregate structure is within a range of about 5 nm to about 1 µm.

24. The aqueous-based primer composition of claim 19 additionally comprising at least one corrosion inhibitor comprising:
   i. one or more of an organic zinc salt, an alkyl-ammonium salt or cycloalkyl-ammonium salt of a mercapto- and/or thio-compound or an alkyl-substituted derivative thereof; and/or
   ii. the combination of an anodic corrosion inhibitor and a cathodic corrosion inhibitor, provided that the anodic corrosion inhibitor is not chromate, and/or
   iii. one or more of an active ingredient selected from the group of anti-corrosion compounds consisting of water soluble corrosion inhibitors, copper complexing agents, pigments containing tungstate or zirconate, and combinations thereof.

25. A primed substrate comprising a substrate surface and a primer layer deposited on said surface, the primer layer comprising the aqueous-based primer composition of claim 24 in a cured state and having a thickness of about 10 µm to about 50 µm, wherein particle size of the at least one corrosion inhibitor is less than the thickness of the primer layer.

26. A method of priming a substrate surface comprising:
   applying a coating of the aqueous-based primer composition of claim 19 to a substrate surface; and
   curing said coating to form a primer layer on the substrate surface.

27. A primer layer made according to claim 26.

28. A primed substrate comprising a substrate surface selected from the group consisting of steel, galvanized steel, iron, galvanized iron, aluminum, copper, zinc, zinc alloy plated steel, cold rolled steel, Zn/Mg plated steel, titanium, cadmium, magnesium and alloys thereof; and the primer layer according to claim 27 deposited on the substrate surface.

29. The primed substrate of claim 28, wherein the primer layer forms a film on said substrate surface and the layer thickness of said film is within a range from about 10 µm to about 50 µm.

30. A bonded assembly comprising:
   two substrates aligned in a spaced apart relationship, each of said substrates having an inwardly facing surface and an outwardly facing surface; and
between the two inwardly facing surfaces is a bond formed by the primer layer according to claim 27 and a cured adhesive, whereby the two substrates are bonded to form the bonded assembly.

31. A coated assembly comprising a substrate, the primer layer according to claim 27 and a topcoat.

32. A method of manufacturing the aqueous-based primer composition in accordance with claim 19, wherein a curative is added to an aqueous dispersion comprising:
   a. the at least one thermosetting, self-emulsifying epoxy resin composition,
   b. the at least one thermosetting, non-self-emulsifying resin composition, and
   c. optionally at least one corrosion inhibitor.

33. A coated assembly comprising a substrate, the aqueous-based primer composition of claim 19 and a topcoat.

34. An aqueous-based primer composition, comprising:
   a. at least one thermosetting, self-emulsifying epoxy resin composition obtained by reaction of (a) epoxy resin, (b) polyhydric phenol, and (c) an amine-epoxy adduct, wherein the amine-epoxy adduct is a reaction product of an aromatic polyepoxide with a polyoxyalkyleneamine;
   b. at least one thermosetting, non-self-emulsifying epoxy based resin composition comprising from 30 to 60 percent by weight of a solid epoxy resin having an epoxy functionality of from 1.8 to 4 and an epoxy equivalent weight of from 100 to 200; from 40 to 70 percent by weight of an epoxy resin having an epoxy functionality of from 1.8 to 4 and an epoxy equivalent weight of from 200 to 800; and from 5 to 20 percent by weight of a solid epoxy resin having an epoxy functionality of 1.8 or more and having an epoxy equivalent weight of from 1000 to 8000, such that the weight percents total 100 percent based on the total weight of the epoxy component of the thermosetting, non-self-emulsifying epoxy based resin composition;
   c. water; and
   d. at least one curative.

35. The aqueous-based primer composition of claim 34, wherein the at least one thermosetting non-self-emulsifying epoxy based resin composition is selected from polyglycidyl derivatives of phenol-formaldehyde novolacs.

36. The aqueous-based primer composition of claim 34, wherein a and b are present in amounts such that a weight ratio of the least one thermosetting, self-emulsifying epoxy resin composition to the at least one thermosetting, non-self-emulsifying resin composition is in a range of 32:5.3 to 60:40.

* * * * *

UNITED STATES PATENT AND TRADEMARK OFFICE
CERTIFICATE OF CORRECTION

PATENT NO.           : 9,522,974 B2                                    Page 1 of 1
APPLICATION NO.      : 12/728605
DATED                : December 20, 2016
INVENTOR(S)          : Emilie Barriau et al.

It is certified that error appears in the above-identified patent and that said Letters Patent is hereby corrected as shown below:

In the Specification

Column 7, Line 40: Change "$R_g(OH)_h$" to -- $R_9(OH)_h$ --.

Column 9, Line 17: Change "polyvinyl phenol)s" to -- poly(vinyl phenol)s --.

Column 11, Line 59: Change "bisphenoi A)" to -- bisphenol A) --.

In the Claims

Column 30, Line 12: Change "non-self-emulsify" to -- non-self-emulsifying --.

Column 30, Line 33: Change "b" to -- by --.

Signed and Sealed this
Fifteenth Day of August, 2017

Joseph Matal
*Performing the Functions and Duties of the
Under Secretary of Commerce for Intellectual Property and
Director of the United States Patent and Trademark Office*